United States Patent
Ellis et al.

(10) Patent No.: US 11,184,218 B2
(45) Date of Patent: Nov. 23, 2021

(54) SERVICE ISSUE PRIORITISATION BASED ON IMPACT USING SOFTWARE TELEMETRY

(71) Applicant: Microsoft Technology Licensing, LLC, Redmond, WA (US)

(72) Inventors: Martin Ellis, Pittsburgh, PA (US); Joyce Fang, Bellevue, WA (US); Ju Hee Cho, Redmond, WA (US); Ross Cutler, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 16/583,252

(22) Filed: Sep. 25, 2019

(65) Prior Publication Data

US 2021/0091998 A1   Mar. 25, 2021

(51) Int. Cl.
*H04L 12/24* (2006.01)
*H04L 29/08* (2006.01)

(52) U.S. Cl.
CPC ........ *H04L 41/0609* (2013.01); *H04L 41/069* (2013.01); *H04L 41/0627* (2013.01); *H04L 41/0636* (2013.01); *H04L 67/16* (2013.01)

(58) Field of Classification Search
None
See application file for complete search history.

(56) References Cited

U.S. PATENT DOCUMENTS

| | | | |
|---|---|---|---|
| 6,536,037 B1* | 3/2003 | Guheen ..................... | G06F 8/71 703/2 |
| 6,615,166 B1* | 9/2003 | Guheen .................. | G06Q 10/06 703/27 |
| 8,046,637 B2 | 10/2011 | Gross et al. | |
| 8,615,741 B2 | 12/2013 | Hudson | |
| 8,978,016 B2 | 3/2015 | Gataullin et al. | |
| 9,098,333 B1* | 8/2015 | Obrecht ............. | G06F 11/3442 |
| 9,208,057 B2 | 12/2015 | Valdiviezo Basauri et al. | |
| 2002/0138582 A1* | 9/2002 | Chandra .............. | G06Q 10/107 709/206 |
| 2002/0147611 A1* | 10/2002 | Greene .......... | G06Q 10/063112 705/1.1 |

(Continued)

OTHER PUBLICATIONS

Gupchup, et al., "Analysis of Problem Tokens to Rank Factors Impacting Quality in VoIP Applications", In Proceedings of the Ninth International Conference on Quality of Multimedia Experience, May 31, 2017, 6 Pages.

(Continued)

*Primary Examiner* — Ranodhi Serrao
(74) *Attorney, Agent, or Firm* — Schwegman Lundberg & Woessner, P.A.

(57) ABSTRACT

A system is provided herein that can correlate service issues with system telemetry associated with the software session associated with those service issues. Using a statistical approach, the system can evaluate data across numerous software sessions to rank the importance of the reported service issues. To accomplish the ranking, the system can parse the reports of service issues on a periodic basis, can extract telemetry identifiers (IDs) from the logs, can query the telemetry, may compute the relative importance of detected issues (in the context of calls going on for that day), and then can report this impact back to the service issue database.

18 Claims, 17 Drawing Sheets

(56) References Cited

U.S. PATENT DOCUMENTS

| | | | |
|---|---|---|---|
| 2002/0188538 A1* | 12/2002 | Robertson | H04L 41/5058 |
| | | | 705/35 |
| 2005/0240621 A1* | 10/2005 | Robertson | H04L 67/1095 |
| 2006/0059107 A1* | 3/2006 | Elmore | G06Q 30/0601 |
| | | | 705/64 |
| 2006/0059253 A1* | 3/2006 | Goodman | G06Q 10/06 |
| | | | 709/223 |
| 2017/0046246 A1 | 2/2017 | Kaulgud et al. | |
| 2017/0351560 A1 | 12/2017 | Smith et al. | |
| 2018/0307582 A1 | 10/2018 | Vikjord et al. | |
| 2019/0347668 A1* | 11/2019 | Williams | H04L 67/2833 |

OTHER PUBLICATIONS

Jacobsen, et al., "Quality of Experience Review Guide", Retrieved from: https://web.archive.org/web/20190510020512/https://docs.microsoft.com/en-us/microsoftteams/quality-of-experience-review-guide, May 9, 2018, 67 Pages.

"International Search Report and Written Opinion Issued in PCT Application No. PCT/US20/038265", dated Oct. 5, 2020, 13 Pages.

* cited by examiner

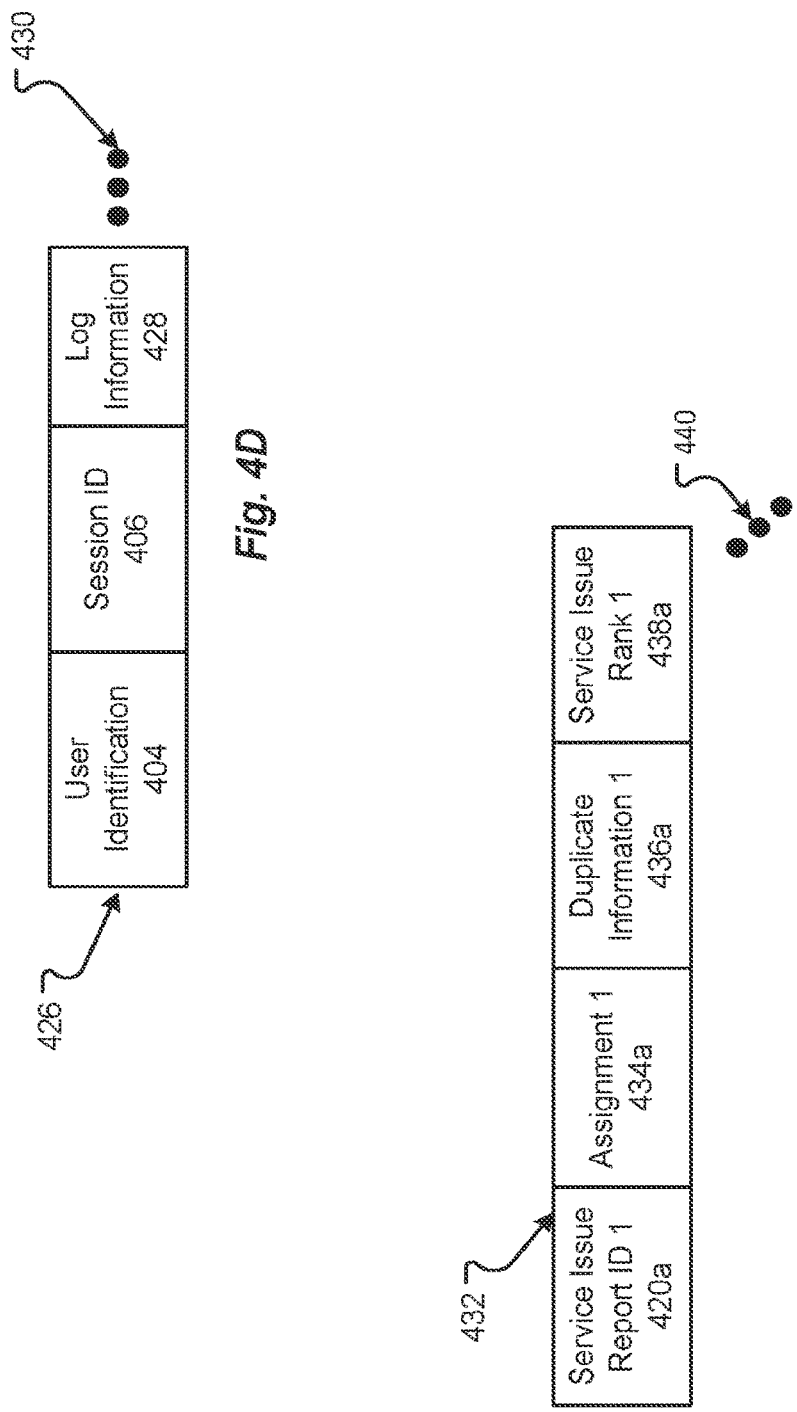

US 11,184,218 B2

SERVICE ISSUE PRIORITISATION BASED ON IMPACT USING SOFTWARE TELEMETRY

BACKGROUND

In many instances today, users turn to software and services including cloud-based services to provide functionality for computers, mobile devices, iOT devices, and other user devices. User quality of experience is an important goal for software developers. As such, developers are constantly working on improving user quality of experience.

Investigation of quality of experience/service issues (e.g., network faults, communication faults, errors, flaws, failures, faults, bugs, and opportunities for improvement) is a time consuming process for software developers. Typical software systems, services, and projects experience hundreds of service issues each day (or more). These service issues are reported to software developers often in logs (e.g., reports) that identify each issue. Logs may be generated by the system and/or reported by users. Regardless, each logged service issue then needs to be investigated to determine its root-cause before it can be fixed. With a large number of service issues reported, it is necessary to assign a priority to each service issue. However, setting the priority for investigation is not simple. The service issues often need to be prioritized manually by software developers to determine which service issues to address in what order. Further, limited information may be available from the log. Thus, prioritization depends on the judgement of the developer making the decision and information available in the initial description provided by the log.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In light of the above limitations, a system is provided herein that can correlate reported service issues with system telemetry associated with the software session associated with those service issues. As used herein, the terms "system telemetry" and "telemetry" shall mean data regarding the use, operation, and/or performance of software, services, systems, applications, and components thereof, including for example, but without limitation, how often certain features are used, measurements of start-up time and processing time, hardware involved, application crashes, individual window metrics, counts of used features, individual function timings, general usage statistics, and user behavior. Using a statistical approach, the system can evaluate data across numerous software sessions to rank the importance of the reported service issues. To accomplish the ranking, the system can parse the reports of reported service issues on a periodic basis, can extract telemetry identifiers (IDs) from the logs, can query the telemetry. Based on this information, the system may determine a problem signature for each of these service issues and then may compute the relative importance of detected issues (in the context of calls going on for that day), and then can report this impact back to a service issue database. The data in the service issue database can then be used to rank or prioritize automatically the current and future issues.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4D is another data structure representing data or signals sent, retrieved, or stored by a service issue insight processor in accordance with aspects of the present disclosure;

FIG. 4E is another data structure representing data or signals sent, retrieved, or stored by a service issue insight processor in accordance with aspects of the present disclosure;

In the attached figures, like numerals in different drawings are associated with like components or elements. A letter following a numeral illustrates one member of a group of elements that may all be represented by the same numeral.

DETAILED DESCRIPTION

Overview

Configurations herein comprise a system that can correlate reported service issues with the system telemetry, associated with a software session during which the service issue occurred. The system may then log data about the session, user feedback, and/or other information associated with those service issues. From this information, aspects of the system can build a machine learning (ML) model from the information to then apply statistical analysis to present and future service issues. Based on the data associated with present service issues, the ML model can rank the importance of the service issues. For example, the system can parse the service issue reports, on a periodic basis, can extract telemetry IDs from the logs and telemetry information, and can compute the relative importance of detected issues (in the context of calls or sessions occurring for some time period) based on a comparison to past data. Further, the importance or other information about the reported service issues can be reported to the developer system for display or for other actions. The system may also use the relative importance to rank or prioritize service issues to allow the developers to address the issues by order of importance.

Example Embodiments

Figure 1:
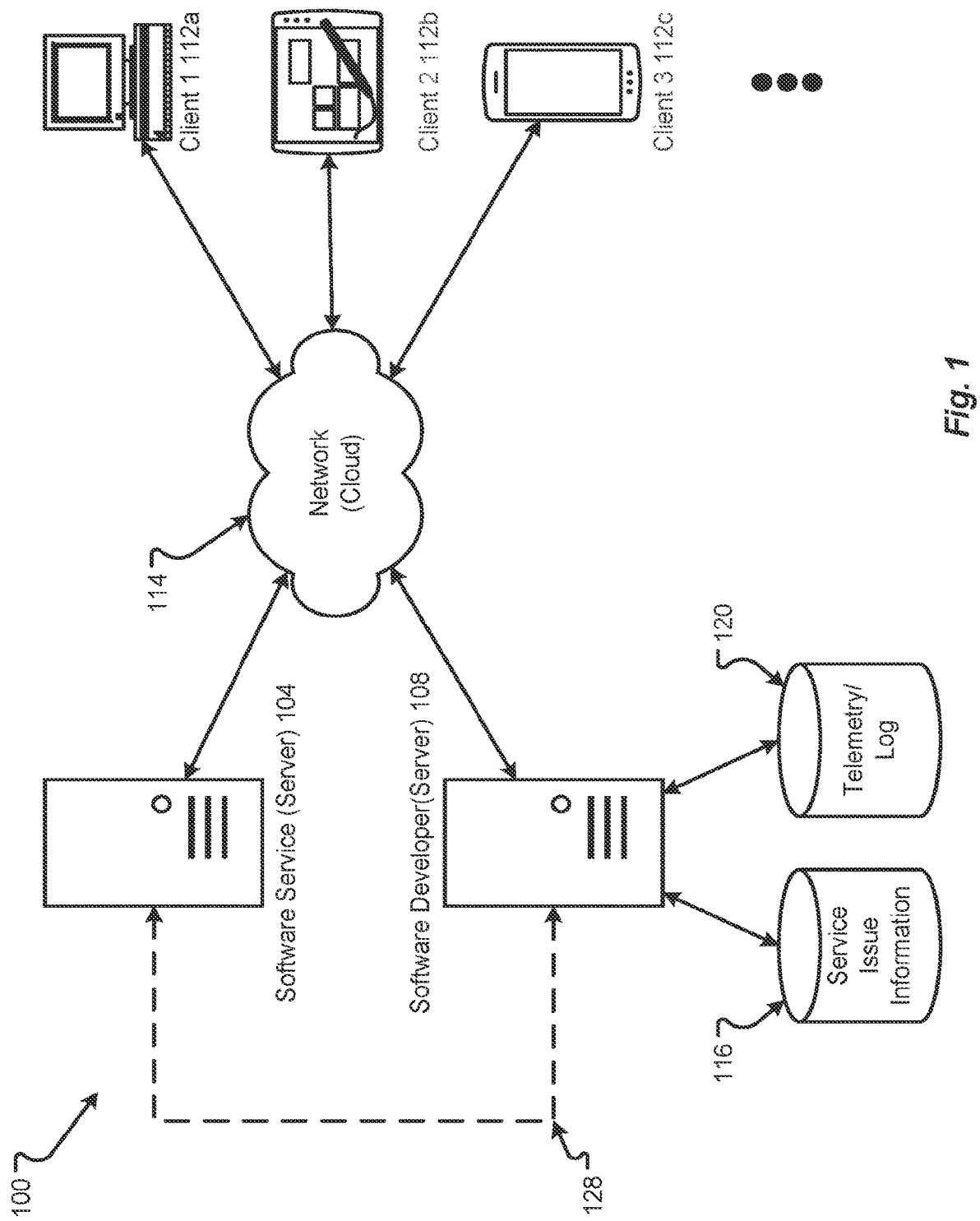
FIG. 1 illustrates a first system diagram in accordance with aspects of the present disclosure.

A system 100 for analyzing service issue information may be as shown in FIG. 1. A software service (server) 104 may be in communication with one or more clients 112a, 112b, 112c, which may execute on a computing system or device. The software service server 104 can be any hardware, software, or combination of hardware and software associated with any computing device, server, or computer as described herein in conjunction with FIGS. 10-13. In at least some configurations, the software service 104 is software executing on a server in or connected to the cloud 114.

Hereinafter, client 112 may be used to represent all of the types of client systems or applications. The client 112 can include any hardware, software, or combination of hardware and software associated with a processor of the client 112, as described herein in conjunction with FIGS. 10-13. The term "client 112" can imply that at least some portion of the functionality of the client 112 is in communication with the user.

It should be noted that the client 112 and the software service 104 may be portions of the same software application. Further, the client 112 may be the portion of the software application that is in communication with the user and executes the user interface to interact with the user, whether that user interface is a visual display, audio interface, or another type of interface. Further, the client 112 and the software service 104 may be portions of the same software application, which executes on different devices, together on the same user device or on a same computing system in communication with the user (e.g., a server), or in some other configuration. Thus, in at least some configurations, there are no communications between the client 112 and the software service 104 over a network 114, but the communications described hereinafter occur on the user device or another computing system.

Further, the software developer server 108 can also execute on the same or different device from the client 112 and/or the software service 104, which means the communications between the software developer server 108, the client 112, and/or the software service 104 may also not occur over the network 114. At least some of the alternative or additional configurations may be as represented by dashed line 128.

The client 112 may communicate with the software service server 104 through a network 114 (also referred to as the cloud). The network 114 can be any type of local area network (LAN), wide area network (WAN), wireless LAN (WLAN), the Internet, etc. Communications between the client 112 and the software service 104 can be conducted using any protocol or standard, for example, TCP/IP, JavaScript Object Notation (JSON), etc. Generally, commands or requests received at the client 112 are routed to the software service 104 for processing, and the client 112 generally does not directly communicate with other computing devices over the network 114 besides the software service 104.

The system 100 can also include a software developer server 108. The software developer server 108 may be in communication with the software service 104 over the network 114. In some configurations, the software developer server 108, the software service 104, and/or the client 112 may operate all on the same device and need not communicate over the network 114. Further, in some configurations, the client 112 may communicate directly with the software developer server 108 without communicating through the software service 104.

The software developer server 108 can be any hardware, software, or combination of hardware and software associated with any computing device, server, or computer as described herein in conjunction with FIGS. 10-13. In at least some configurations, the software developer 108 is also software executing on a server in the cloud 114. An example of at least a portion of software executing on the software developer server 108 may be as described in conjunction with FIG. 2. Further, the software developer server 108 may be in communication with, have access to, and/or include one or more databases or data stores, for example, the service issue information data store 116 and/or the telemetry/log data store 120.

The data stores 116 and 120 can be data or information that is service issue-specific to the service issue witnessed or reported by the client 112. The data stores 116/120 can store the information in any format, structure, etc. on a memory or data storage device, as described in conjunction with FIGS. 10-13. Generally, the telemetry/log information 120 can include information associated with a software session where the service issue was encountered and that are specific to the communication(s) between the client 112 and the software service 104. The telemetry/log information 120 can include information that may be of interest to the software developer as described in the summary above.

The software developer server 108 can retrieve the service issue information from one or more of the data stores 116, 120. Then, the software developer server 108 can synthesize the retrieved information into information about the various service issues being encountered by clients 112, which can be provided to the software developers to better address the reported service issues. For example, the system can map the impact of and store particular "problem signatures" associated with user experiences (or other metric of interest). This signature information and any other impact metrics can be based on evaluating the service issue by separating groups of problems into distinct issue types and identifying the impact on performance for each issue type. Using this mapping, session information can be collected and the impact of any impairments (i.e., problem areas) found in the session can be identified. The statistical summary of the impacts can be collected for each service issue report, and the service issue reports may be sorted by the sum of impacts for the service issue (this sorting may use the average impact or some other aggregation). The sorting can provide a priority listing for the various service issue reports.

This sorting of service issue reports may apply to various cloud-provided software, for example, but without limitation, collaboration applications, productivity applications, communication applications, game applications, video applications, etc. Regardless of the type of software provided as a service, the software service can have associated telemetry data, logs, and Key Performance Indicators (KPIs) that can be analyzed for service issue prioritization.

From the output received from the software developer server 108, the software developers can determine which service issues to address first to improve the experience of the client 112 and its users. This process for ranking or prioritizing service issues may be as described in conjunction with FIGS. 7-9. The ranking may be provided as a user interface or other output to the software developer server 108.

Figure 2:
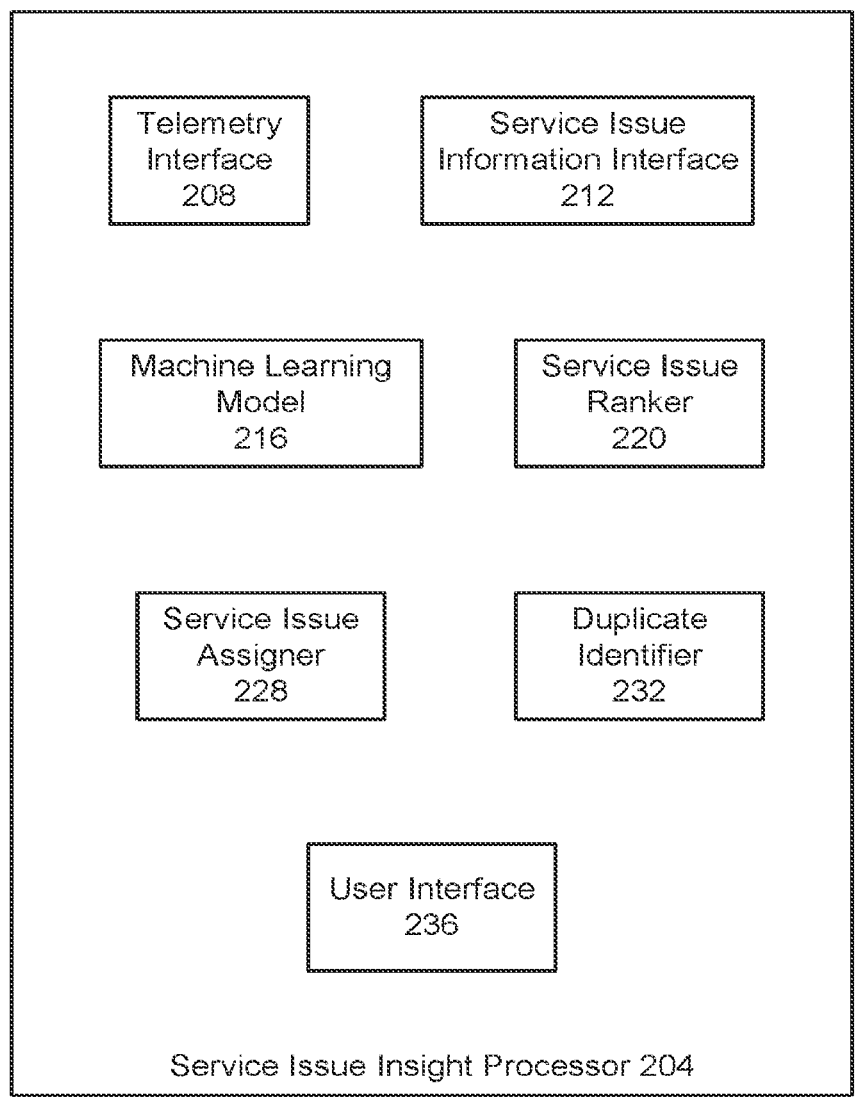
FIG. 2 illustrates a block diagram of a service issue insight processor in accordance with aspects of the present disclosure.

One or more components of the software developer server 108 may be as shown in FIG. 2. The software developer server 108 can include a service issue insight processor 204 that executes on or in conjunction with the software developer server 108. The service issue insight processor 204 can include one or more of, but is not limited to, a telemetry interface 208, a service issue information interface 212, a machine learning model 216, a service issue ranker 220, a service issue assigner 228, a duplicate identifier 232, and/or a user interface 236. These components 204-236 can be embodied in hardware, software, or hardware and software, which may be executed by a processor, as described in conjunction with FIGS. 10-13.

The telemetry interface 208 can interface with one or more clients 112 and/or the software service 104 to receive telemetry associated with an interaction between the client 112 and the software service 104. The telemetry can describe the conditions and performance of the interaction between the client 112 and the software service 104. The telemetry may be as described in conjunction with data structure 412 in FIG. 4B. Further, the telemetry may be associated with the interaction represented by signal 302, as described in conjunction with FIG. 3. The telemetry interface 208 can store the telemetry information in telemetry data store 120.

Service issue information interface 212 can be the interface with one or more clients 112 and/or the software service 104 to receive information or a report of the service issue witnessed or experienced during an interaction, between the client 112 and the software service 104. The service issue may be as reported in signals 304a or 304b in FIG. 3. The service issue information may be as described in data structure 412 of FIG. 4C. The service issue information can be any information that may describe a perceived service issue, issue, and/or problem with the client 112, the software service 104, and/or the interaction between the two. The service issue may be local to the client 112 and/or associated with the software service 104. Service issue information may be stored in data store 116.

The machine learning (ML) model 216 can be an artificial intelligence application generated with service issue information, telemetry information, communication information, etc. The ML model 216 may then be applied to determine or evaluate service issues or conditions associated with service issues. The determinations made by the ML model 216 may then be provided to other components of the service issue insight processor 204, for example, the service issue ranker 220, the service issue assigner 228, etc. Thus, the ML model 216 can provide the information that allows for the automatic processing of service issues within the software developer server 108.

The service issue ranker 220 can receive information from the ML model 216 and determine a rank for the various service issues. Thus, the service issue ranker 220 can evaluate the various service issues in the information provided by the ML model 216 to generate a rank for each service issue as described in data structure 432 of FIG. 4E. The service issue ranker 220 may rank the service issues based on an effect of the service issue, the number of occurrences of the service issue, the recency of the occurrences of the service issue, the damage the service issue may do, or other types of considerations. The service issues may be ranked based on an aggregation of weights provided to each of the above or other factors.

The service issue assigner 228 can assign the service issue to a team or person within the software developer organization, for example, based on the team's or person's skills, proficiency, or other factors. Thus, the service issue assigner 228 can receive information from ML model 216 to determine how to address the service issue. These assignments are automatic but may be changed with user input. However, the ML model 216 and/or service issue assigner 228 may perform the automatic assignment more proficiently over time as the model becomes more accurate.

The duplicate identifier 232 can identify which of two or more service issues may be the same or similar. A duplicate service issue can be any type of error or problem that is related or may have the same impact or caused by the same issues within the system. Duplicate service issues can have the same signature recognizable by the ML model 216. Duplicate identifier 232 can receive the model information from them ML model 216 to determine which service issues may be duplicates and combine those service issues into a single aggregated service issue assignment. The number of duplicate service issues may affect the service issue ranking or the service issue assignment. In some configurations, the duplicate identifier 232 can automatically eliminate duplicate service issues. In other configurations, the duplicate identifier 232 can associate or link the different service issues together. Duplicate information may also be stored in data structure 432, as described in conjunction FIG. 4E, which may be stored in service issue information data store 116.

The user interface 236 can provide information to the developer/user through one or more user interfaces displayed on the developer/user computer. The information provided to the developer/user may be as described herein in conjunction with data structures 402 through 432. Examples of various user interfaces that may be provided by the user interface 236 may be as described in conjunction with FIGS. 5A through 5C.

Figure 3:
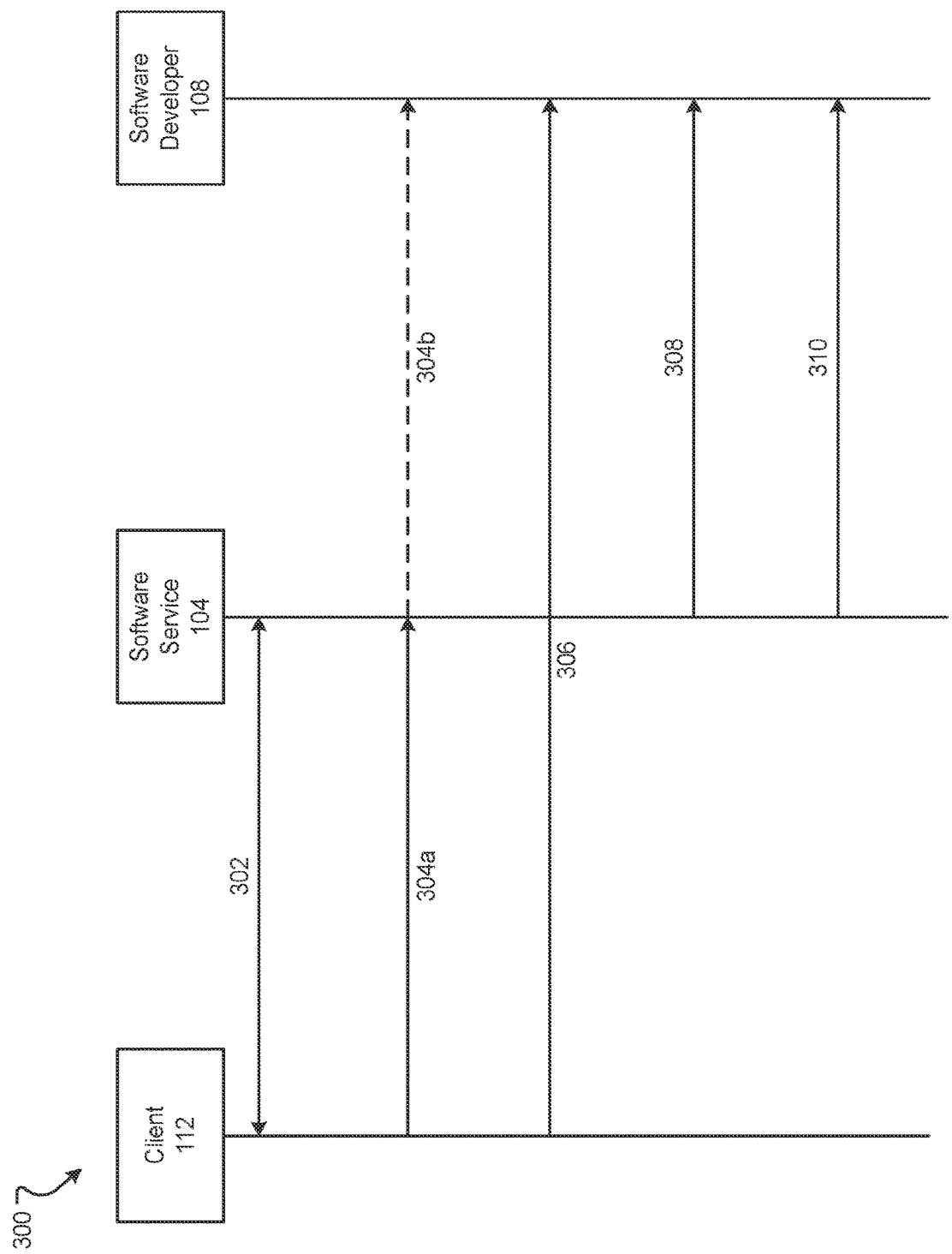
FIG. 3 illustrates a signaling diagram of signals sent between components in accordance with aspects of the present disclosure.

A configuration of a signaling process 300 as provided herein may be as shown in FIG. 3. The one or more signals may contain data or other information, which may be as described in conjunction with FIGS. 4A-4E. First, the client 112 can interact with a software service 104. The interaction may contain one or more signals 302 that are exchanged during the interaction. The signals 302 may include one or more communications between the client 112 and the software service 104 during a communication session, a gaming session, or other type of session with an application or a service provided by the software service 104.

Signal 304a and 304b can be signals that report information or service issues to the software developer 108. For example, the signal 304a can be a report of a service issue from the client 112 to the software service 104. The service issue report may be relayed from the software service 104 to the software developer 108, in signal 304b. For example, the signal 304 may be sent by the client 112 to the service issue information interface 212 at the developer 108. The signal 304 can include the information as described in conjunction with the data structure 402, in FIG. 4A. Additionally or alternatively, signal 304a can also include a service issue report, as described in conjunction data structure 418 in FIG. 4C.

Further information may be provided from either the client 112 or the software service 104. Signal 306 can include at least some of that further information. Such further information can include the telemetry provided from the client 112, in signal 306, and received by the telemetry interface 208 at developer 108. The telemetry may be as described in conjunction with data structure 412 of FIG. 4B and as defined herein. Other information can also include log information provided by the client 112. Log information may be as described in conjunction with data structure 426 of FIG. 4D.

Signal 308 can be a signal that reports information or service issues to the software developer 108 from the software service 104. For example, the signal 304 can be a report of a service issue from the client 112 to the software service 104. The service issue report may be relayed from the software service 104 to the software developer 108 in signal 308. The signal 308 may be sent by the software server 104 to the service issue information interface 212 of the developer 108. The signal 308 can include the information as described in conjunction with data structure 402 in FIG. 4A. Additionally or alternatively, signal 308 can also include a service issue report as described in conjunction with data structure 418 of FIG. 4C.

Signal 310 can include any further information that may be provided from the software service 104 to the software developer 108. Signal 310 can include the telemetry provided from the software service 104, in signal 310, and provided to the telemetry interface 208. The telemetry may be as described in conjunction with data structure 412 of FIG. 4B. Other information can also include log information provided by the software service 104. Log information may be as described in conjunction with data structure 426 of FIG. 4D.

Configurations of data and data structures that can be stored, retrieved, managed, etc. by the system 100 may be as shown in FIGS. 4A-4E. The data structures may be part of any type of data store, database, file system, memory, etc. including object oriented databases, flat file databases, etc. The data structures may also be part of some other memory configuration. The data structures can have more of fewer portions or fields than those shown in FIGS. 4A-4E.

Data structure 402 can represent a problem report, a service issue report, or other information provided from the client 112 regarding an issue or problem with a session with the software service 104. The data structure 402, shown in FIG. 4A, can include one of more of, but is not limited to, user identification data 404, a session identifier (ID) 406, and/or user comments 408. There may be more or fewer fields in data structure 402, as represented by ellipses 410. The user identification 404 can comprise a numeric ID, and alphanumeric ID, a globally unique ID (GUID), an Internet Protocol (IP) address, a user voiceprint, a user name, a user password, other biometric information, etc. The user identification information 404 may be provided by the user or incorporated by the client 112 into the data structure 402 of FIG. 4A.

Session ID 406 can include any information that may uniquely identify that session (as represented by signals 302) between the client 112 and the software service 104 compared to other interactions between other the same or different client 112 and the same or different software service 104. The session ID 406 can include one or more of, but is not limited to, a numeric ID, an alphanumeric ID, a GUID, or other information.

User comments 408 can include any information provided by the user and/or the client 112 to describe the problem or issue with the software service 104. The comments can include a description of the service issue or problem encountered during a session with the software service 104. A portion of the information or all the information may be automatically generated by the client 112. Additionally or alternatively, a human user may input text, screenshots, or other information into an application or interface on the client 112 to report the information, in user comments 408, about the problem or issue encountered.

Data structure 412 can include the telemetry or other metadata that may be automatically created, stored, or acquired during a session between the client 112 and the software service 104. The data structure 412, shown in FIG. 4B, can include one of more of, but is not limited to, user ID data 404, a session identifier (ID) 406, and/or telemetry 414. There may be more or fewer fields in data structure 412, as represented by ellipses 416. The user ID 404 and the session ID 406 may be similar to or the same as those fields 404, 406, as described in conjunction with the data structure 402 of FIG. 4A. As such, these fields will not be described further here.

Telemetry 414 can include the automatically generated, retrieved, stored information about the session (as represented by signals 302) between the client 112 and the software service 104. The telemetry information 414 can include one or more of, but is not limited to, communication information (e.g., link quality, bandwidth, ports used, the amount of data sent or received, etc.), application information, device information, etc. The telemetry information 414 can provide information about any communication or interaction problems that may or may not have occurred during the session between the client 112 and the software service 104. The telemetry information may be as stored in database 120.

Data structure 418 can include the service issue information or other metadata that may be automatically created, stored, or acquired during a report of a service issue. The data structure 418, shown in FIG. 4C, can include one of more of, but is not limited to, user ID data 404, a session ID 406, a service issue report ID 420, and/or service issue information 422. There may be more or fewer fields in data structure 418, as represented by ellipses 424. The user ID 404 and the session ID 406 may be similar to or the same as those fields 404, 406 as described in conjunction with the data structure 402 of FIG. 4A. As such, these fields will not be described further here.

Service issue report ID 420 can be any type of identifier that uniquely identifies this service issue compared to other service issues being addressed or stored within the software developer system 108 and/or the service issue information database 116. The service issue report ID 420 can be a numeric ID, an alphanumeric ID, a GUID, or other types of identifiers.

Service issue information 422 can include any information about the service issue that may be automatically retrieved, stored, generated from the client 112, software service 104, and/or provided by the human user. The service issue information 422 can include one or more of, but is not limited to, the fault or error that occurred, a timestamp or date of when the fault occurred, configurations of the communications, application, device, or computing system, when the fault occurred, domains or other location information about the device 112 or software service 104 when the fault occurred, etc. The service issue information 422 may also include a predetermined or automatically generated description of the service issues that may have been created previously based on a similar or like service issue being experienced.

Figure 4A:
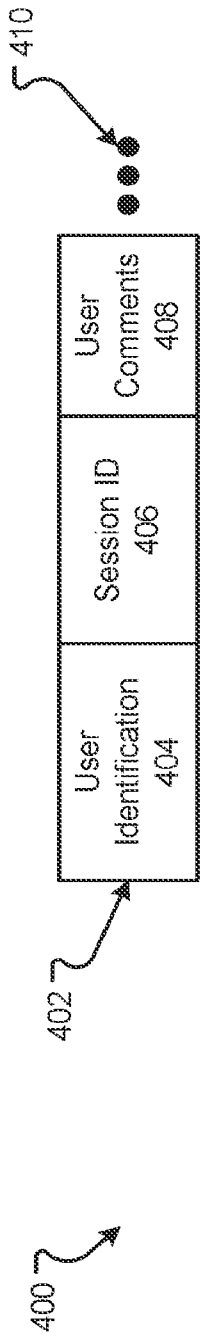
FIG. 4A illustrates a data structure representing data or signals sent, retrieved, or stored by a service issue insight processor in accordance with aspects of the present disclosure.
Figure 4B:
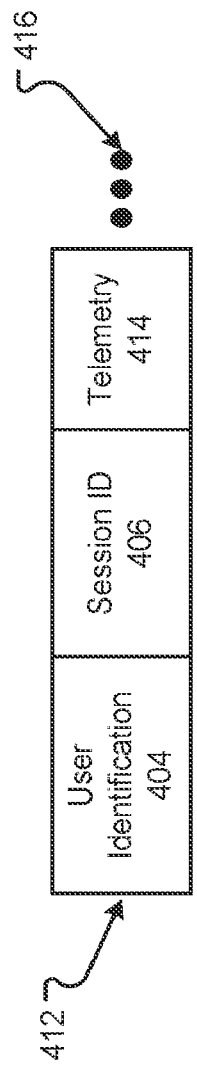
FIG. 4B is another data structure representing data or signals sent, retrieved, or stored by a service issue insight processor in accordance with aspects of the present disclosure.
Figure 4C:
FIG. 4C is another data structure representing data or signals sent, retrieved, or stored by a service issue insight processor in accordance with aspects of the present disclosure.

Data structure 426, shown in FIG. 4D, can include the log information or other metadata that may be automatically created, stored, or acquired during a session between the client 112 and the software service 104. The data structure 426 can include one of more of, but is not limited to, a user identification data 404, a session identifier (ID) 406, and/or log information 428. There may be more or fewer fields in data structure 426, as represented by ellipses 430. The user identification 404 and the session ID 406 may be similar or the same as those fields 404, 406 as described in conjunction with the data structure 402 of FIG. 4A. As such, these fields will not be described further here.

Log information 428 can include any information about inputs or outputs received by or generated by the client 112 and/or software service 104. Log information 420 includes those types of interactions not included in the telemetry 414 or in the communication information. For example, any inputs provided by the client 112 during the interaction may be stored within the log. Further any type of outputs generated by the software service 104 and then output to a client 112 for display or provision to a user may also be stored within the log. This information allows for description of any of the interactions between the user and the software service 104. This information may be as stored in the telemetry/log database 120. In aspects, log information 420 may be included as part of telemetry information 414.

The data structure 432 shown in FIG. 4E can represent information about one or more service issues. A first set of service issue information, service issue report ID 1 420a, assignment 1 434a, duplicate information 1 436a, service issue rank 1 438a, can apply to a first service issue, while an nth set of service issue information, service issue report ID n 420n, assignment n 434n, duplicate information n 436n, service issue rank n 438n, can apply to an nth service issue. There may be more or fewer sets of service issue information than that shown in FIG. 4E, as represented by ellipses 440. Each set of service issue information can include one of more of, but is not limited to, a service issue report ID 420, an assignment 434a, duplicate information 436, and/or a service issue rank 438. There may also be more or fewer fields in each set of service issue information, also as represented by ellipses 440. The service issue report ID 420 may be similar or the same as that field 420, as described in conjunction with the data structure 418 of FIG. 4C. As such, field 420 will not be described further here.

The assignment 434 can include an identifier for an individual or team that is automatically assigned to address the service issue listed in the data structure 432. The assignment identifier 434 can include a name, a position, a numeric ID, and alphanumeric ID, a GUID, etc. The assignment identifier 434 can identify the person or team uniquely amongst all of the people or teams addressing service issues.

Duplicate information 436 can include the service issue report ID 420 of one or more other service issues that may be related to the service issue listed in the data structure 432. Thus, the duplicate information 436 can list one or more service issues, by the service issue ID 420, and may list that duplicate information 436 based on similarity or other information that may rank or order the list of duplicates.

Service issue rank 438 can include some type of order or listing of the service issues in data structure 432. The service issue rank 436 can be based off of various characteristics. For example, the service issue rank 438 can be based off of the frequency or number of occurrences of the service issue, the impact of the service issue to the system, or other types of information or parameters. In data structure 432, service issue 1, listed by service issue report ID 1 428, may have the highest service issue rank, and thus be stored in the more significant portion of data structure 432. The lowest rank service issue 420n may be stored in the least significant portion of data structure 432, and thus be lower ranked.

Figure 5A:
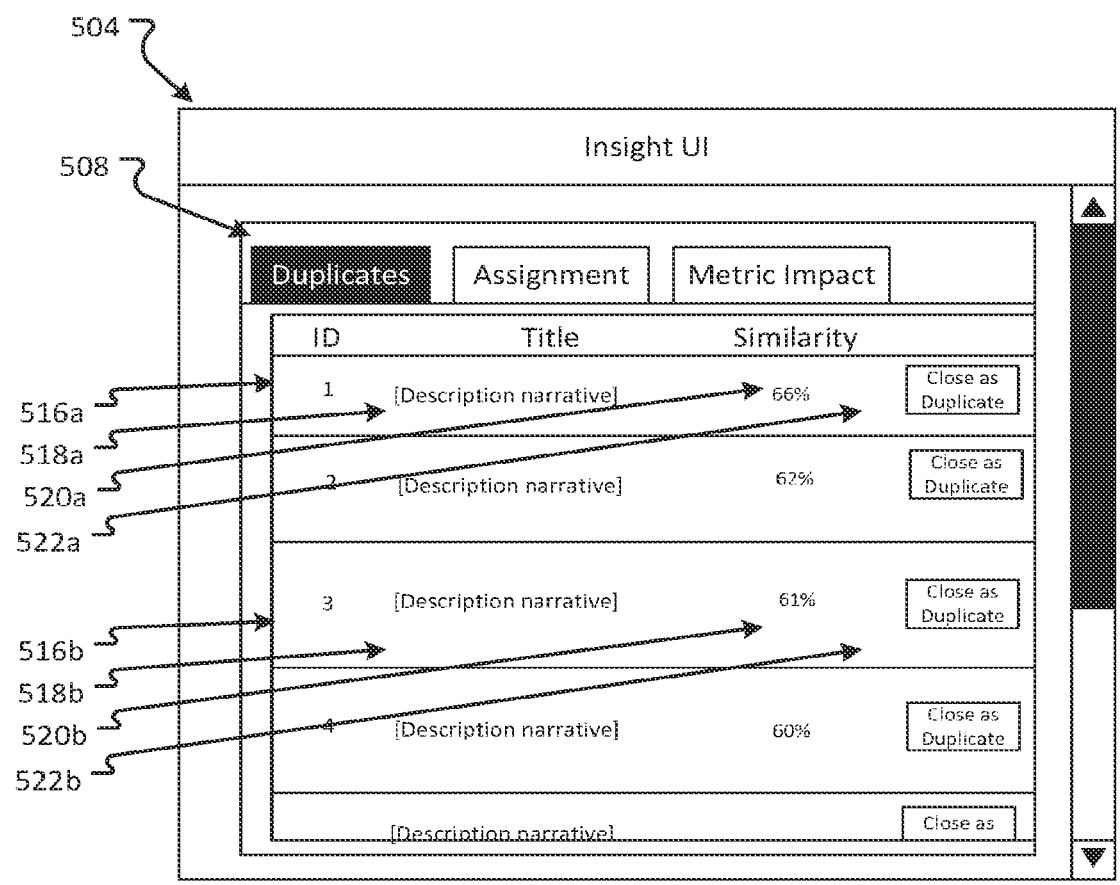
FIG. 5A illustrates a user interface presenting information associated with reported service issues in accordance with aspects of the present disclosure.

A first user interface 504, which can be provided on a display of a software developer computing system, may be as shown in FIG. 5A. User interface 504 can be a portion of a larger user interface (not shown) that can report information on one or more service issues. Thus, the user interface component 236 can produce the user interface 504 for the service issue insight processor 204. The user interface 504 can include one or more tabs 508, 512, and/or 514. Each tab 508-514 may provide different information about the service issues. This information may be generated by the ML model 216, service issue ranker 220, service issue assigner 228, duplicate identifier 232 etc.

A user interface 504 that can be provided on a display of a software developer computing system, in response to selecting a "Duplicates" tab 508, may be as shown in FIG. 5A. Duplicate information can include one or more IDs 516a, 516b, which may be extracted from data structure 432, in field(s) 420a. The IDs 516 provide a unique identifier for the various service issues. Each service issue can also display a title 518a, 518b. The title 518 may provide a short description of the service issue.

The duplicates portion 508 may also include a similarity score 520a, 520b. The similarity score 520 can provide an estimation or determination of the similarity of that service issue to one or more other service issues in the system. This information may be generated by the duplicate identifier 232 and stored as duplicate information 436. In the example shown in FIG. 5B, the duplicate information is provided as a similarity score that indicates how similar that current service issue is to another service issue in the system. For example, service issue 516a has a similarity score of 66%, shown in user interface portion 520a. In contrast, service issue 516b has a similarity score of 61%, shown in portion 520b. Thus, the ML model 216 and/or the duplicate identifier 232 can have determined that service issue 516a is more likely a duplicate then service issue 516b.

The user interface 504 can also include a user interface control 522a, 522b that may be selectable by user input into user interface. Selecting the control 522 can close the service issue as a duplicate. As such, the user may be provided with an automatic estimation of the similarity of the service issue and then may manually close the service issue report as a duplicate, thus eliminating the need to respond to multiple instances of the same or similar service issue. Alternatively or additionally the duplicate identifier 232 may automatically close duplicate service issues. For example, if the similarity score 520 crosses some predetermined threshold, the duplicate identifier 232 may then close that service issue is a duplicate. As such, the duplicates shown in user interface 504 when selecting the duplicate staff 508 may be those duplicates that are below the threshold level but may still be considered duplicates.

Figure 5B:
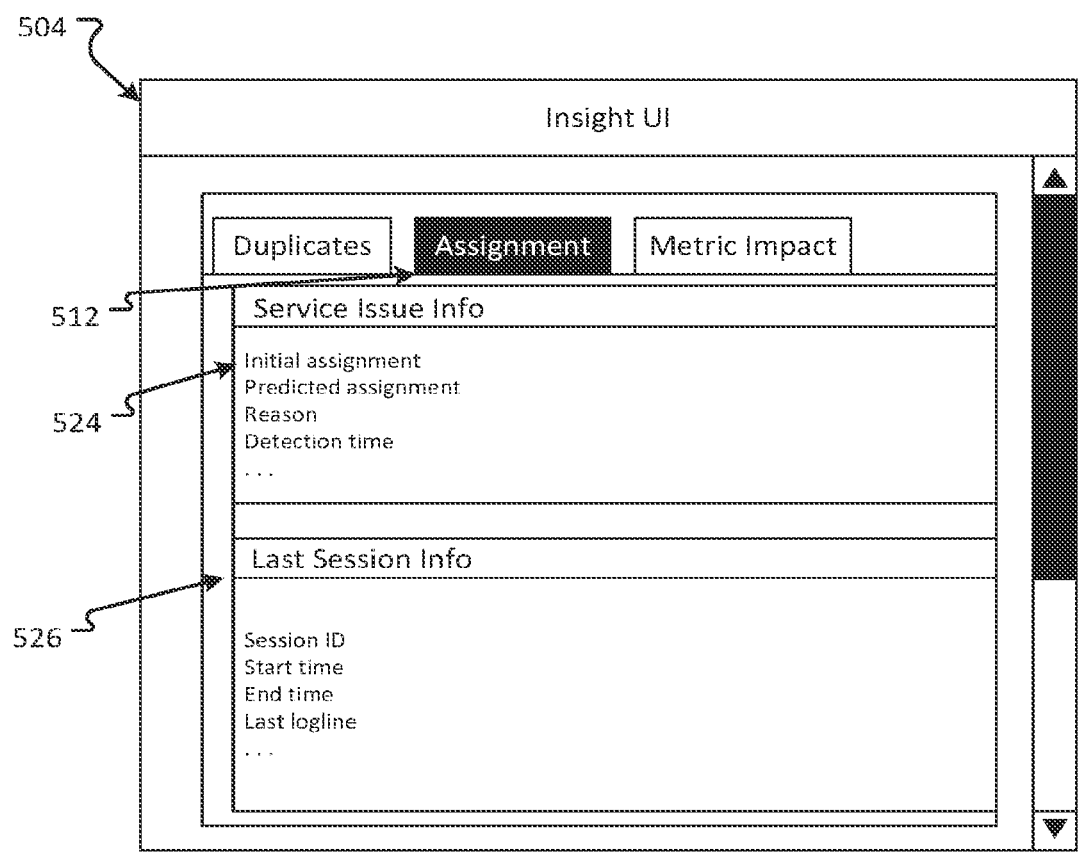
FIG. 5B illustrates a user interface presenting information associated with reported service issues in accordance with aspects of the present disclosure.

A user interface 504 that can be provided on a display of a software developer computing system, in response to selecting an "Assignment" tab 512, may be as shown in FIG. 5B. In this user interface 504, the assignment information may include an initial path 524. The initial path 524 may include an initial assignment (e.g., directory path or URL for storing the service issue to the appropriate developer person or team to address the service issue). In other words, the initial assignment indicates to which team the service issue is automatically or manually assigned. A predicted assignment may indicate what type of service issue or what category of service issue this service issue may be. The prediction portion indicates whether the service issue is, for example, a communication service issue, an interface service issue, a storage service issue, etc. The predicted assignment can indicate a smaller subdivision of a team within the assigned group provided in the initial assignment. In other configurations, the predicted assignment can indicate whether the service issue should be addressed, deleted, or some other action performed on the service issue. The assignment 512 may be provided automatically from the service issue assigner 228 and may be as stored in the assignment field 434 of data structure 432.

In a lower portion 526, the service issue and/or the session may be identified to which the service issue is associated may be identified. For example, portion 526 can list the session ID 406 (e.g., call ID), which can indicate which session the service issue is associated. Regardless, the lower portion 526 can also identify the service issue assigned in the upper portion of user interface 504. Lower portion 526 may also identify the start and end time of the session and the last logline, among other information.

Figure 5C:
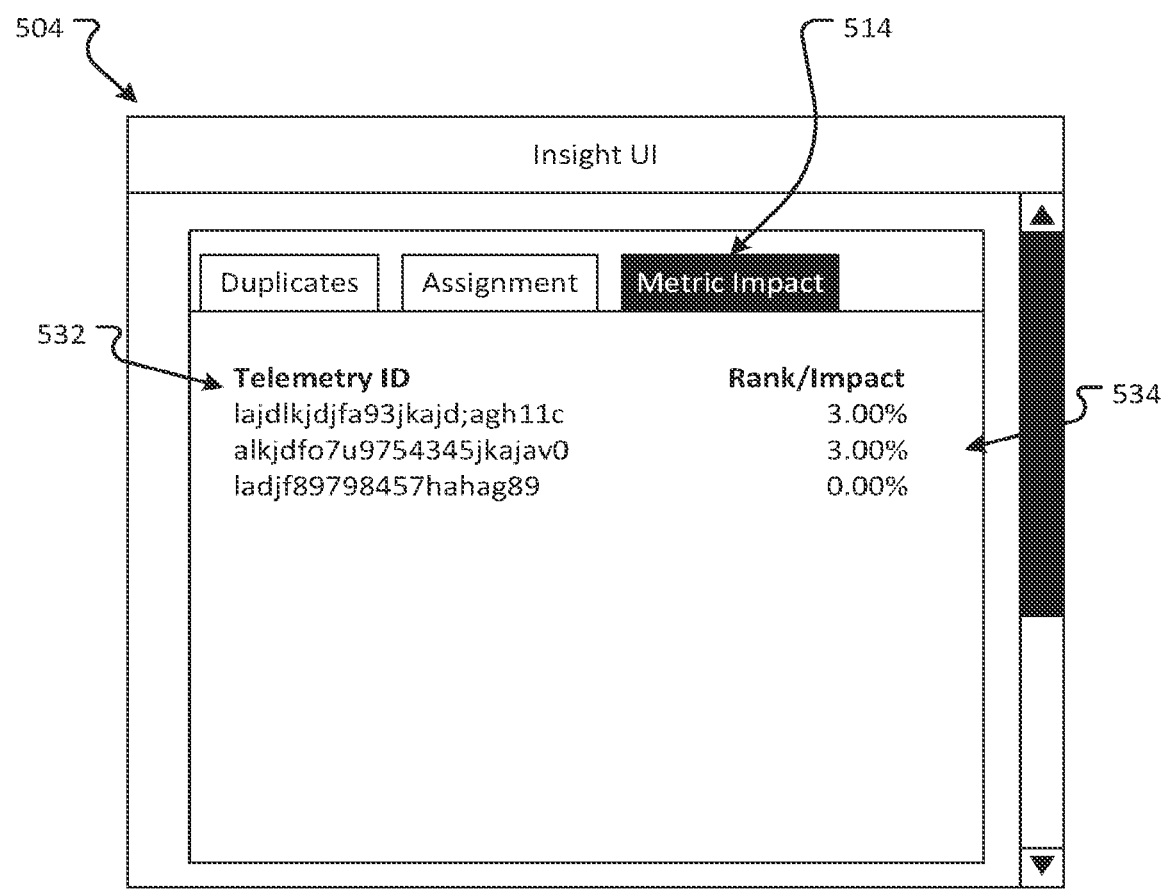
FIG. 5C illustrates a user interface presenting information associated with reported service issues in accordance with aspects of the present disclosure.

A user interface 504 that can be provided on a display of a software developer computing system, when selecting a "Metric Impact" tab 514, may be as shown in FIG. 5C. A final tab 514 may provide a user interface 504 that indicates the ranking or impact of the service issue. The ranking information may be generated by the service issue ranker 220 and/or the ML model 216 and may be as stored in the service issue rank information 438 of data structure 432, described in conjunction FIG. 4E.

The service issue rank may include an identifier 532 that may be extracted from the service issue report ID 420. This identifier 532 can be a telemetry ID as shown in user interface 504. Thus, the identifier 532 can include the user identification 404 or session ID 406 associated with the service issue. In other configurations, the identifier 532 can be the service issue report ID 420.

Associated with each identifier 532 can be of rank or impact score 534. The impact of rank 534 can be a measure of the severity or impact of the service issue on the system. In other configurations, the rank may be a simple ranking of service issues and based on several or one characteristic of the service issue. One such characteristic may be the frequency of occurrence or the impact of the service issue on the system but other characteristics may be used to help rank the service issue. The service issue rank information may be as generated by the service issue ranker 220 and stored in the service issue rank field 438 in data structure 432. The order of the service issues, from top to bottom, shown in user interface 504 may match the order of the service issues in data structure 432 from left to right. In at least some configurations, the rank or impact may be an impact determined by an algorithm and/or based on KPI.

Figure 6:
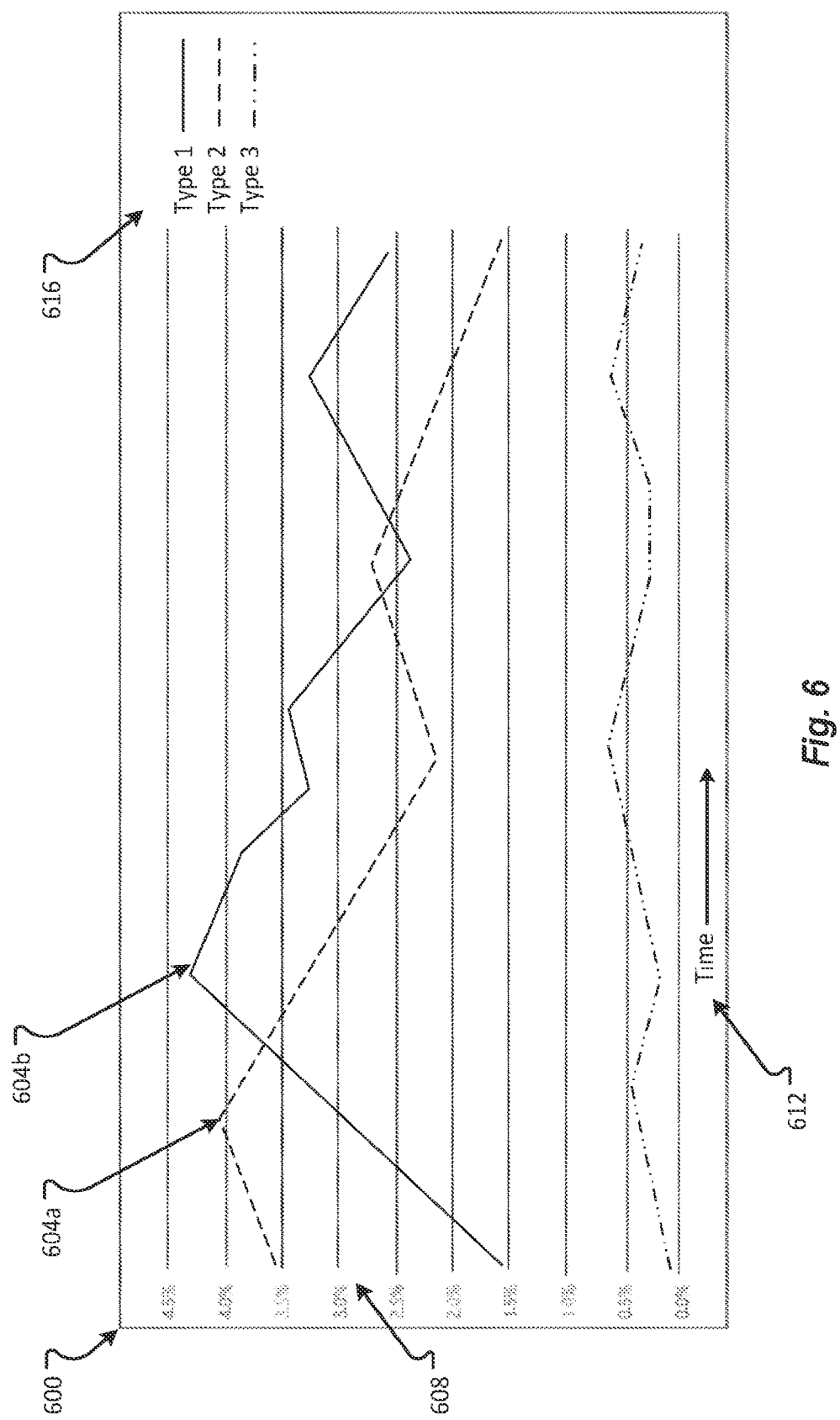
FIG. 6 illustrates a user interface presenting information associated with reported service issues in accordance with aspects of the present disclosure.

A user interface 600 or data representation that can be provided on a display of a software developer computing system, for displaying the impact of one or more service issue types, may be as shown in FIG. 6. User interface 600 can include an impact score or frequency of occurrence 608 along the vertical axis and a date along the horizontal axis 612. One or more different service issue types may be listed in a legend 616. Each service issue type may have an impact graph, for example, 604a, 604b. The impact graphs 604 indicate the impacts or frequency of the service issues listed in legend 616. This breakdown of service issue information indicates the impact of previous service issues, which have a predetermined service issue signature. The ML model 216 and/or the service issue ranker 220 can later match current or future service issues with the past signatures. Then, with information shown in FIG. 6, ML model 216 and/or the service issue ranker 220 rank the current or future service issues using the impact information shown in FIG. 6. For example, the metric impact 534, shown in FIG. 5, may be derived from information provided in graphical user interface 600 shown in FIG. 6

Figure 7:
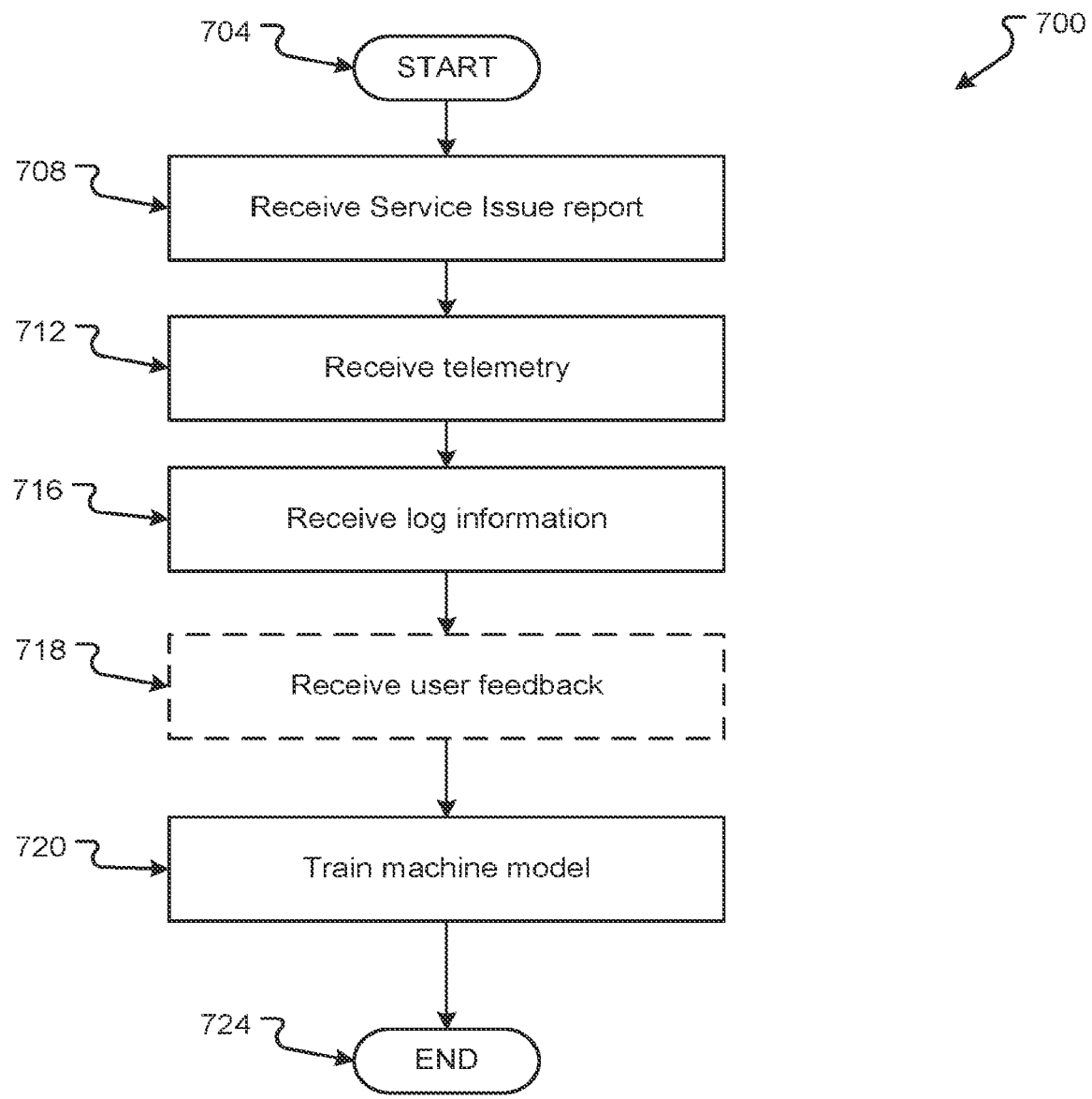
FIG. 7 illustrates a method, conducted by a service issue insight processor, for training a machine learning model in accordance with aspects of the present disclosure.

A method 700, as conducted by the software developer service 108, for training a ML model to evaluate service issues may be as shown in FIG. 7. A general order for the steps of the method 700 is shown in FIG. 7. Generally, the method 700 starts with a start operation 704 and ends with an end operation 732. The method 700 can include more or fewer steps or can arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an application specific integrated circuit (ASIC), a field programmable gate array (FPGA), a system-on-chip (SOC), or other hardware device. Hereinafter, the method 700 shall be explained with reference to the systems, components, devices, modules, software, data structures, user interfaces, methods, etc. described in conjunction with FIGS. 1-6 and 8-13.

The service issue information interface 212 can receive a service issue report, in step 708. The client 112 can send a service issue report 418, in signal 304a, which may be forwarded to the software developer 108, by software service 104, in signal 304b. In some configurations, the client 112 can send the service issue report 418 directly to the software developer 108, in signal 306. Still further, the software service 104 may send the service issue report 418 to the software developer 108 in signal 304b. The service issue report may contain the information in data structure 418, as described in conjunction with FIG. 4C. This service issue report 418 may be received by the service issue information interface 212 and provided to the ML model 216 for analysis and further management by the service issue ranker 220 or service issue assigner 228. The service issue report 418 may be stored in data store 116.

The software developer 108 can then receive the telemetry data structure 412, from the software service 104 and/or the client 112, in step 712. The telemetry may be sent in signal 306 from the client 112 and/or in signal 308 from the software service 104. The telemetry may be received by the telemetry interface 208 and provided to the ML model 216. The telemetry information may include the information in data structure 412, as described in conjunction FIG. 4B. The telemetry information may also be stored in telemetry/log data store 120.

The software developer 108 may then receive log information, in step 716. The log information may be sent in signal 306 and/or signal 308 from the client 112 and/or the software service 104 to the software developer 108. The log information may include the information, as described in conjunction with data structure 426 of FIG. 4D. The log information may be received by the telemetry interface 208 and provided to the ML model 216. The log information may be stored in telemetry/log information data store 120.

In at least some configurations, the service issue information interface 212 or the telemetry interface 208 may receive user feedback, in step 718. User feedback may include information not included in the service issue report and/or the telemetry information. Thus, the user information can include information from data structure 402, as is described in conjunction with FIG. 4A. The user feedback can be specific complaints or comments about the service and signals 302 that may indicate a service issue. User feedback can include information not specific to particular service issue but indicative of a service issue that may be present in the system(s) or application(s). In other situations, the user feedback 718 may further clarify what occurred with the service issue reported by the client 112 or the software service 104. User feedback is optional and thus the box 718 in FIG. 7 is dashed. Any user feedback may be provided to the ML model 216 to better enhance the ML model. The user feedback may be stored in telemetry/log data store 120.

The machine learning model component 216 may then train the ML model, in step 720. In aspects, the service issue information 418, the telemetry information 412, the log information 426, and/or the user feedback in data structure 402 may be provided for training the ML model as part of a convolutional neural network (CNN), deep neural network, or any other type of machine learning model. The ML model 216 may attempt to determine a profile or signature for different types of service issues, as is visualized in FIG. 6. The different characteristics or signatures define the service issues and their impact, the damage possible from the service issues, or other factors may be determined by the ML model. The ML model may store the algorithm used to define each service issue and its impact on service issue information 116. After training, the ML model 216 may be deployable upon reaching an effectiveness threshold. The effectiveness threshold may be determined by the ML model component 216 when the ML model is able to characterize service issues at a particular confidence interval.

Figure 8:
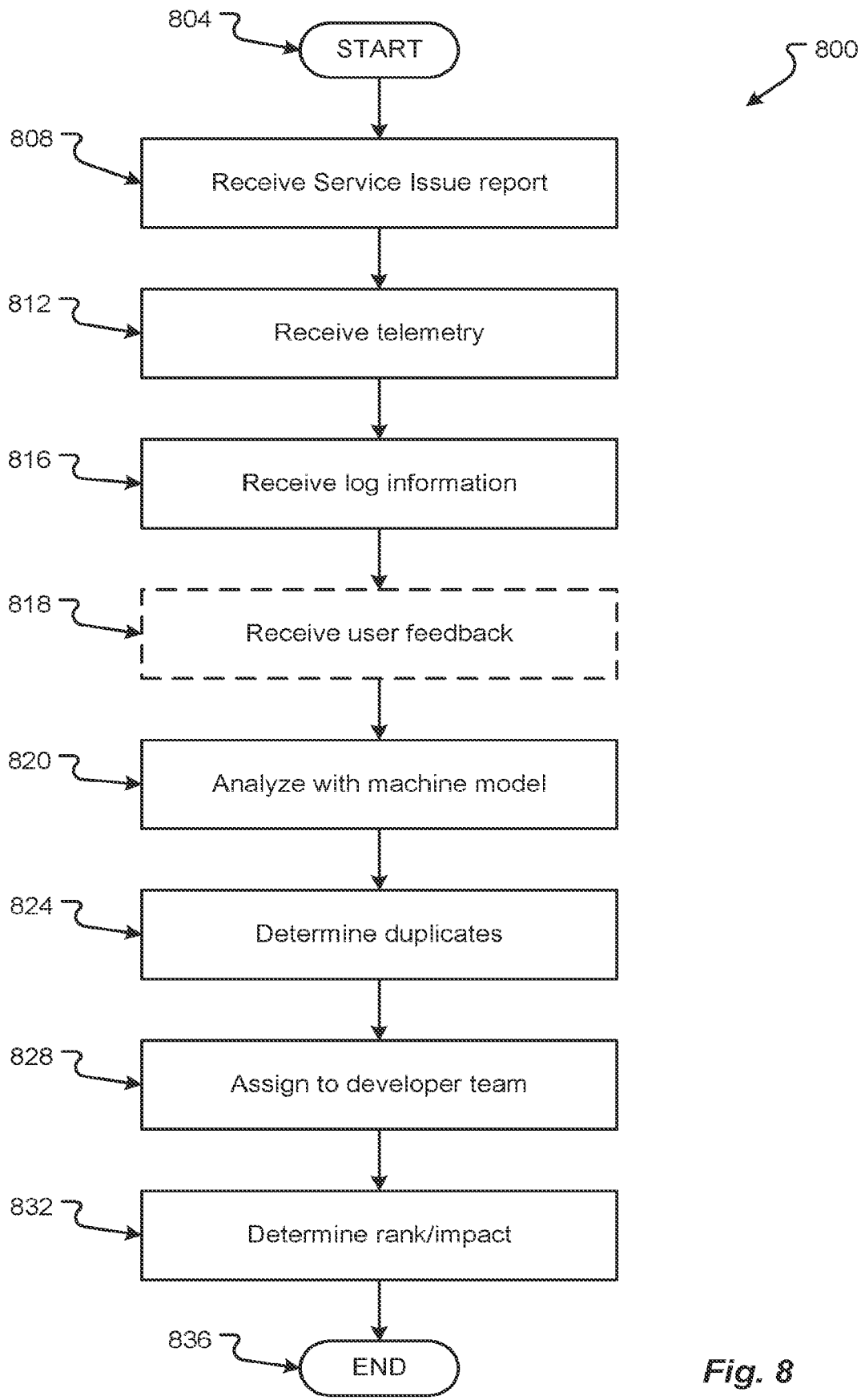
FIG. 8 illustrates a method, conducted by a service issue insight processor, for evaluating service issue reports in accordance with aspects of the present disclosure.

A method 800, as conducted by the software developer server 108, for evaluating a software service issue with an ML model may be as shown in FIG. 8. A general order for the steps of the method 800 is shown in FIG. 8. Generally, the method 800 starts with a start operation 804 and ends with an end operation 832. The method 800 can include more or fewer steps or can arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, an ASIC, a FPGA, a SOC, or other hardware device. Hereinafter, the method 800 shall be explained with reference to the systems, components, devices, modules, software, data structures, user interfaces, methods, etc. described in conjunction with FIGS. 1-7 and 9-13.

After deploying the ML model, the service issue insight processor 204 can receive a service issue report at the service issue information interface 212, in step 808. The client 112 can send a service issue report 418 in signal 304a, which may be forwarded to the software developer 108, by software service 104, in signal 304b. In some configurations, the client 112 can send the service issue report 418 directly to the software developer 108, in signal 306. Still further, the software service 104 may send the service issue report 418, to the software developer 108, in signal 304b. The service issue report may contain the information in data structure 418, as described in conjunction with FIG. 4C. This service issue report 418 may be received by the service issue information interface 212 and provided to the ML model 216 for analysis and further management by the service issue ranker 220 or service issue assigner 228. The service issue information may be stored in service issue information data store 116.

The software developer 108 can also receive new telemetry associated with a communication session 302, in data structure 412, from the software service 104 and/or the client 112, in step 712. The telemetry may be sent in signal 306 from client 112 and/or in signal 308 from software service 104. The telemetry may be received by the telemetry interface 208 and provided to the ML model 216. The telemetry information may include such information as is in data structure 412, as described in conjunction FIG. 4B. The telemetry information may be stored in telemetry/log data store 120.

The software developer 108 may then receive new log information, in step 716. The log information may be sent in signal 306 and/or signal 308 from the client 112 or the software service 104 to the software developer 108. The log information may include such information as described in conjunction with data structure 426 of FIG. 4D. The log information may be received by the telemetry interface 208 and provided to the ML model 216. The log information may also be stored in telemetry/log information data store 120.

In at least some configurations, the service issue information interface 212 or telemetry interface 208 may receive new user feedback, in step 718. User feedback may include information not included in the service issue report, the log information, and/or the telemetry information. Thus, the user information can include information data structure 402 as is described in conjunction with FIG. 4A. The user feedback can be specific complaints or comments about the service and signals 302 that may indicate a service issue. Thus, user feedback can include such information not specific to particular service issue, but indicative of a service issue that may exist in the system. In other situations, the user feedback 718 may further clarify what occurred with the service issue reported by the client 112 or the software service 104. User feedback is optional and thus box 818, in FIG. 8, is dashed. Any user feedback may be provided to the ML model 216 to better enhance the results produced by the ML model. The user feedback may also be stored in telemetry/log data store 120.

The machine learning model component 216 may then analyze the service issue information with the ML model, in step 820. Thus, the service issue information 418, the telemetry information 412, the log information 426, and/or the user feedback in data structure 402 may be provided to the ML model 216. The machine learning model 216 can then determine a profile or a signature for the different service issues, as is visualized in FIG. 6. The different characteristics or signatures of the service issues, the impact of the service issue, the possible damage that the service issue may cause, or other factors may be determined by the ML model 216. The analyzed service issue information, the service issue signature, or data associated with the service issue signature may then be passed to the various other components 220, 228, 232.

A duplicate identifier 232 may receive the service issue information as analyzed by the ML model 216. The duplicate identifier 232 may then identify duplicates of service issues, in step 824. The duplicate information may provide pairs or sets of service issue report IDs 420 that are the same or have similarities. The similarities may be as described in conjunction with duplicate information 436, as described in conjunction FIG. 4E. Further, the duplicate identifier 232 can determine an amount of similarity in a similarity score, as is described in conjunction with FIG. 5B. The duplicate information may be stored in duplicate information field 436, with the service issue report ID 432, as described in conjunction with FIG. 4E. The data structure 432 may then be stored in data store 116 for provision to the software developer user interface 236.

A service issue assigner 228 may then assign the service issue to a developer or developer team, in step 828. The service issue assigner 228 may receive the information from the ML model 216 that characterizes the service issue and then pair that service issue signature with the developer that may best address that type of service issue. The identification of the developer or the developer team may then form the assignment identification, which may be stored in the assignment field 434, in data structure 432, is described in conjunction FIG. 4E. An example of the assignment information may be as described in conjunction FIG. 5C. The assignment information may be provided to the user interface 236 for the software developer 108 and stored in the service issue information data store 116.

A service issue ranker 220 may then determine the impact of the service issues presented to the software developer 108 and generate a rank from the impacts, in step 832. The service issue ranker 220 receives the characterization information or signature from the ML model 216 and determines, based on past experiences with service issues having the same or similar signature, as described in conjunction with FIG. 6, the impact of the service issue. The impact and/or prevalence of the service issue may factor into the ranking of the service issue by the service issue ranker 220. Other characteristics may be reviewed or analyzed by the service issue ranker 220. This information allows the service issue ranker 220 to determine which service issues may have the greatest impact and/or has greatest frequency of occurrence or other factors that generate the service issue rank, stored in field 438, of data structure 432, as described in conjunction with FIG. 4E. In at least some situations, the service issue ranker 220 uses KPI information to determine a rank of the service issue. Such information may be as described in conjunction with FIG. 5C. The rank of the service issue may then be presented in user interface 236 for the software developer 108 and stored in service issue information data store 116.

Figure 9:
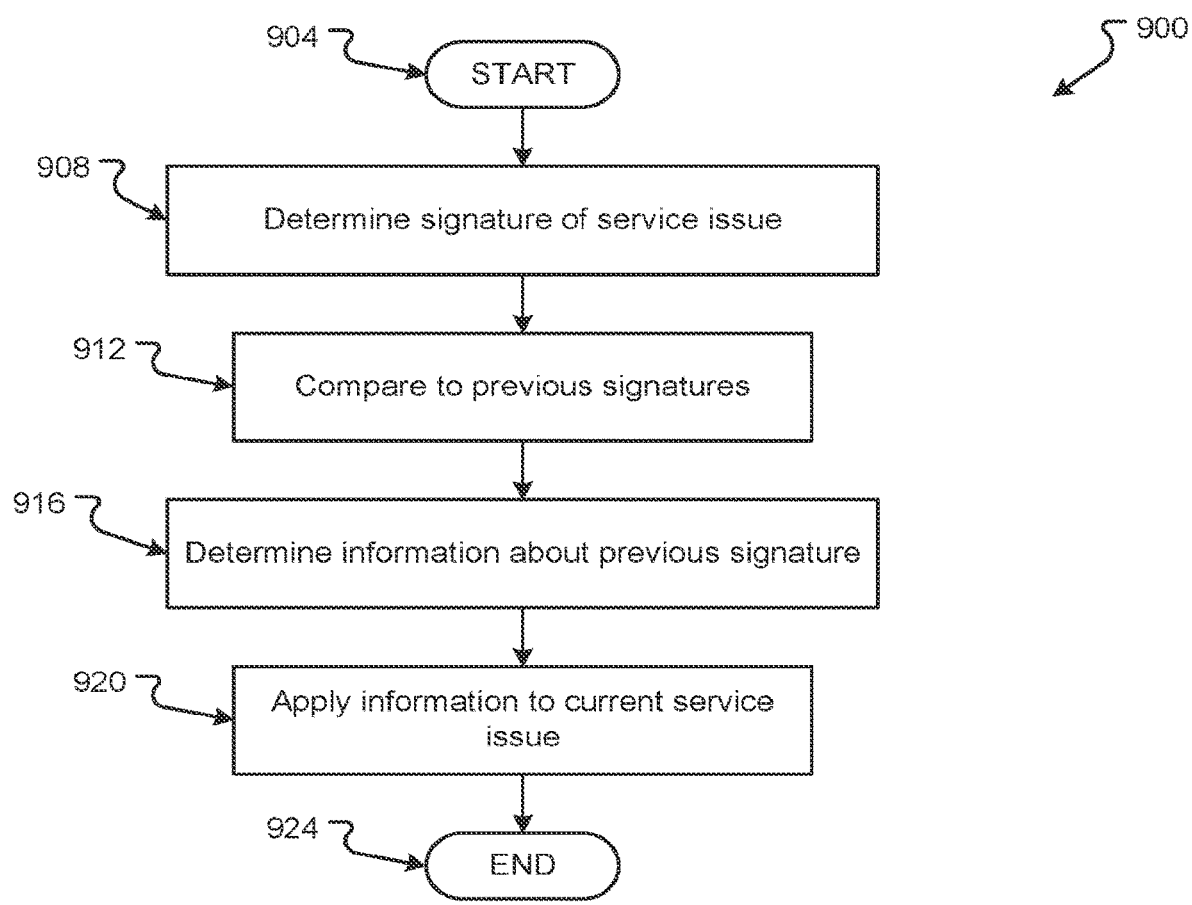
FIG. 9 illustrates a method, conducted by a service issue insight processor, for evaluating service issue reports in accordance with aspects of the present disclosure.

A related method 900 for how the ML model functions to characterize different service issues may be as shown in FIG. 9. A general order for the steps of the method 900 is shown in FIG. 9. Generally, the method 900 starts with a start operation 904 and ends with an end operation 924. The method 900 can include more or fewer steps or can arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, an ASIC, a FPGA, a SOC, or other hardware device. Hereinafter, the method 900 shall be explained with reference to the systems, components, devices, modules, software, data structures, user interfaces, methods, etc. described in conjunction with FIGS. 1-8 and 10-13.

The ML model 216 can determine a signature of the service issue, in step 908. The signature of the service issue can include any type of characterization of the service issue, a description or assessment of the service issue components, the effect of the service issue, and/or other types of parameters. The signature information may be determined from the user comments, telemetry, service issue information, and/or log information, as described above in conjunction with FIG. 8. This signature information or characteristics of a service issue may be unique to that service issue or type of service issue and provide an ability for the ML model 216 to compare the current service issue to previous signatures of similar or the same type of service issue.

The ML model 216 may then compare the generated signature from step 908 to previous signature, in step 912. For example, the ML model 216 may determine if the signature, characteristics, and/or parameters of the service issue are similar to any previous signatures, as described in conjunction with FIG. 6. If the similarity is above a predetermined threshold, for example 80% confidence interval, the ML model 216 can determine that the current service issue is the same as or similar to a previously characterized, described service issue and identify the new service issue as related to the old, pre-determined service issue.

With the current service issue identified as being similar to previous service issue, the ML model 216 may then determine information about the previous service issue based on the past service issue's signature, in step 916. The characteristics of the service issue, impact of the service issue, and/or frequency of occurrence of the service issue in the past may then allow the service issue ranker 220, service issue assigner 228, duplicate identifier 232, and other components of the service issue insight processor 204 to the determine information about the current service issue. Thus, the previous service issue, as described with FIG. 6, may be used to then rank or manage the service issues.

This information about the previous service issue may then be applied by the ML model 216 or other components of the service issue insight processor 204, in step 920. For example, the service issue ranker 220 can determine, from previous signatures as described in FIG. 6, how the service issue should be ranked for being addressed by software developer 108. The assignment of the previous service issue can inform the assignment of the current service issue. And other service issues that have been related to the same past service issue may be determined to be a duplicate.

Figure 10:
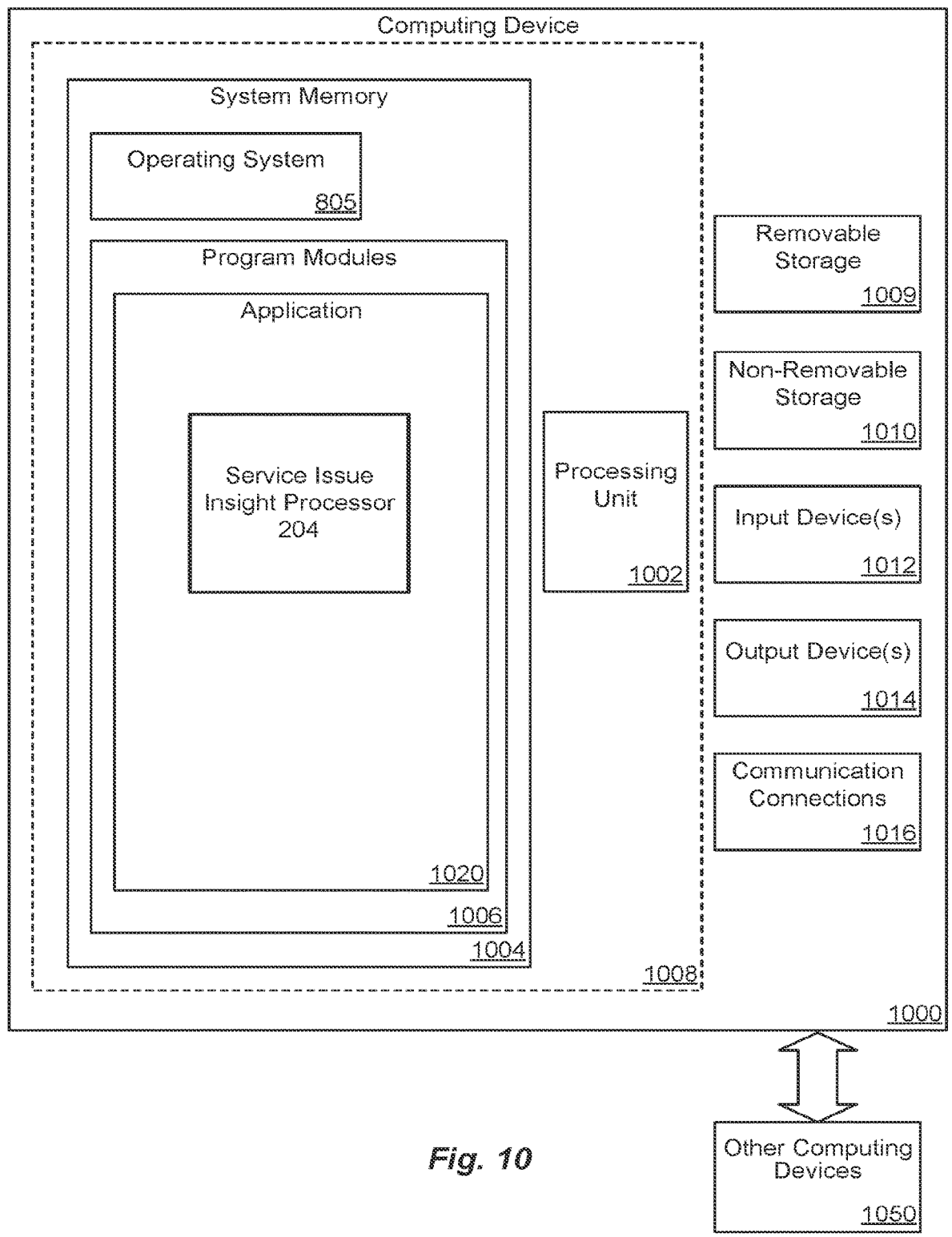
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may be suitable for the computing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1008 and one or more program modules 1006 suitable for performing the various aspects disclosed herein such as identity provider 1024 and attribute inference processor 1026. The operating system 1008, for example, may be suitable for controlling the operation of the computing device 1000. Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1080. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
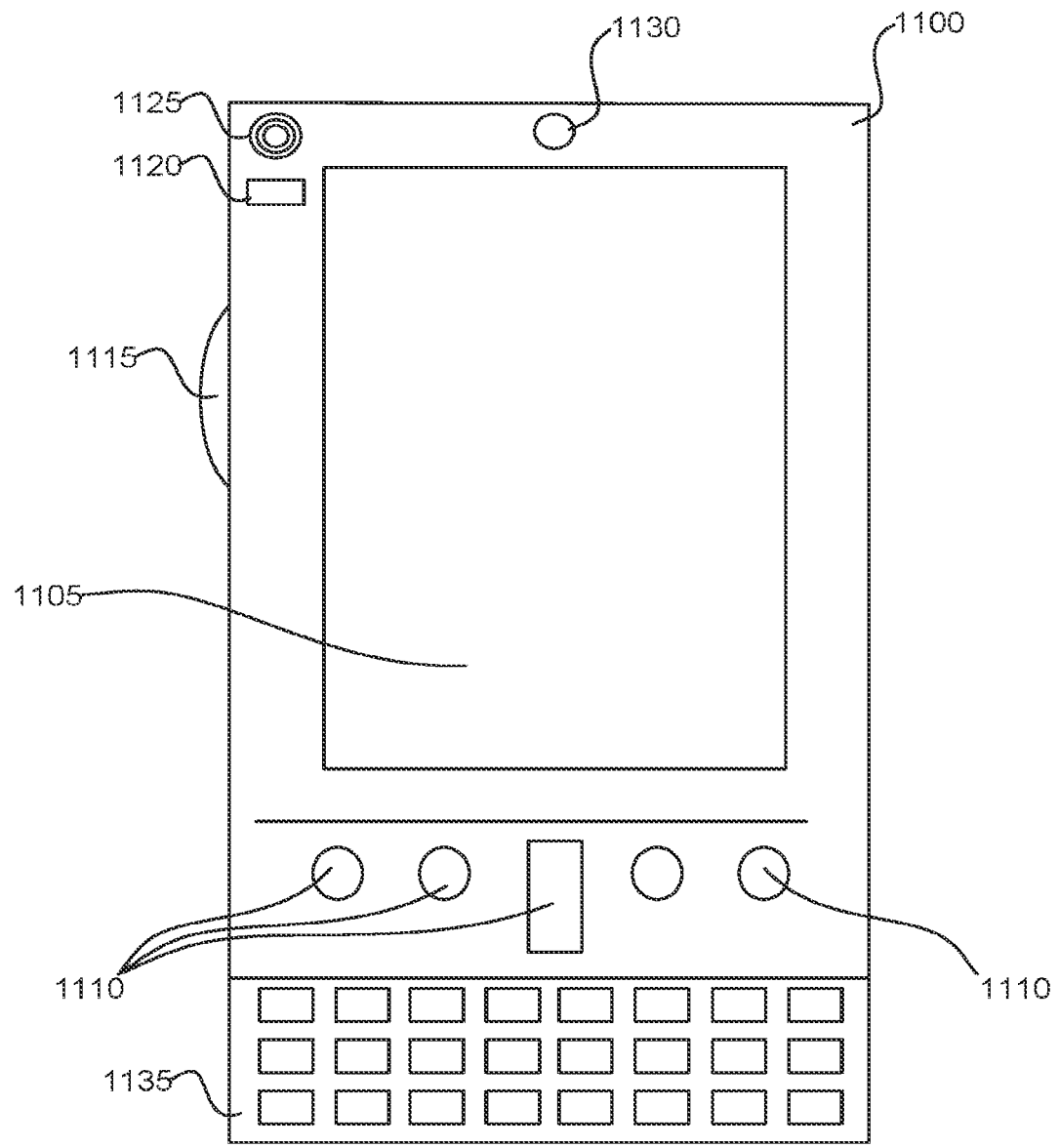
FIG. 11A is a simplified block diagram of a computing device with which aspects of the present disclosure may be practiced.
Figure 11B:
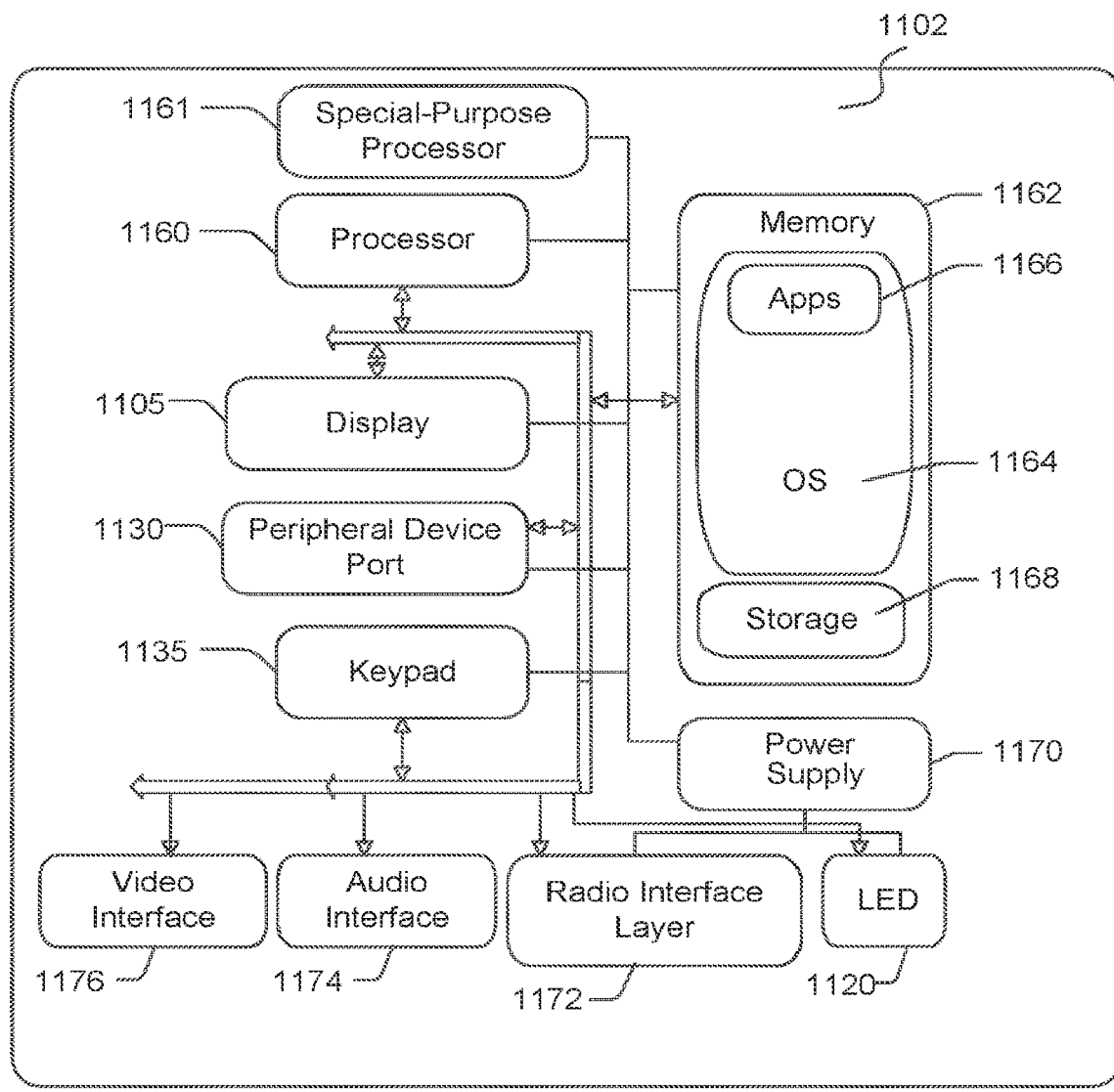
FIG. 11B is another are simplified block diagram of a mobile computing device with which aspects of the present disclosure may be practiced.

FIGS. 11A and 11B illustrate a computing device or mobile computing device 1100, for example, a mobile telephone, a smart phone, wearable computer (such as a smart watch), a tablet computer, a laptop computer, and the like, with which aspects of the disclosure may be practiced. In some aspects, the client (e.g., computing systems 104, 108, 112) may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some aspects. In yet another alternative aspect, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various aspects, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of computing device, a server (e.g., server 108 or server 104), a mobile computing device, etc. That is, the computing device 1100 can incorporate a system (e.g., an architecture) 1102 to implement some aspects. The system 1102 can implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., search engine, extractor module, relevancy ranking module, answer scoring module, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated configuration, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
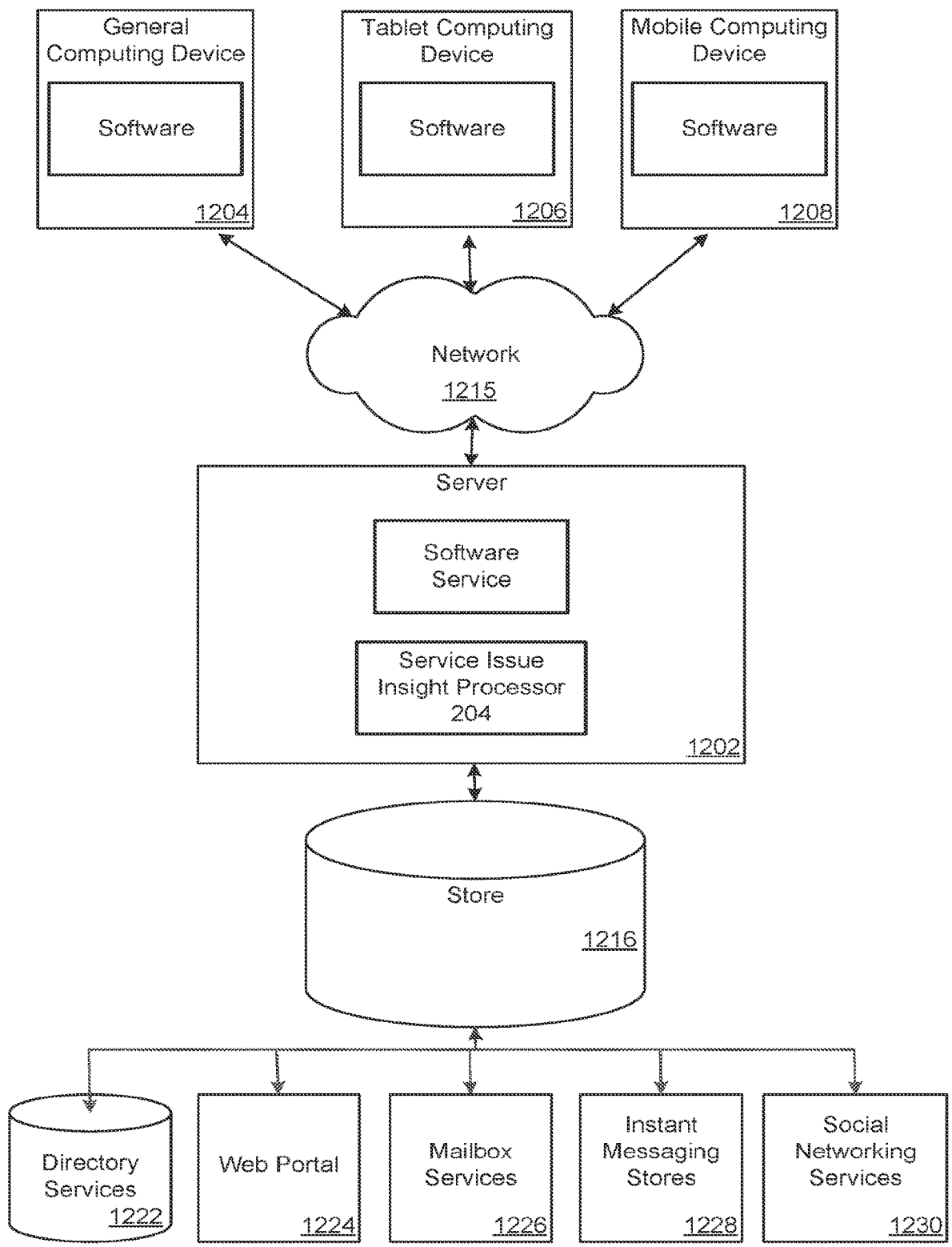
FIG. 12 is a simplified block diagram of a distributed computing system in which aspects of the present disclosure may be practiced.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. Unified profile API 1221 may be employed by a client that communicates with server device 1202, and/or attribute inference processor 1220 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these configurations of the computing devices may obtain content from the store 1216, in addition to receiving graphical data useable to be either pre-processed at a graphic-originating system, or post-processed at a receiving computing system.

Figure 13:
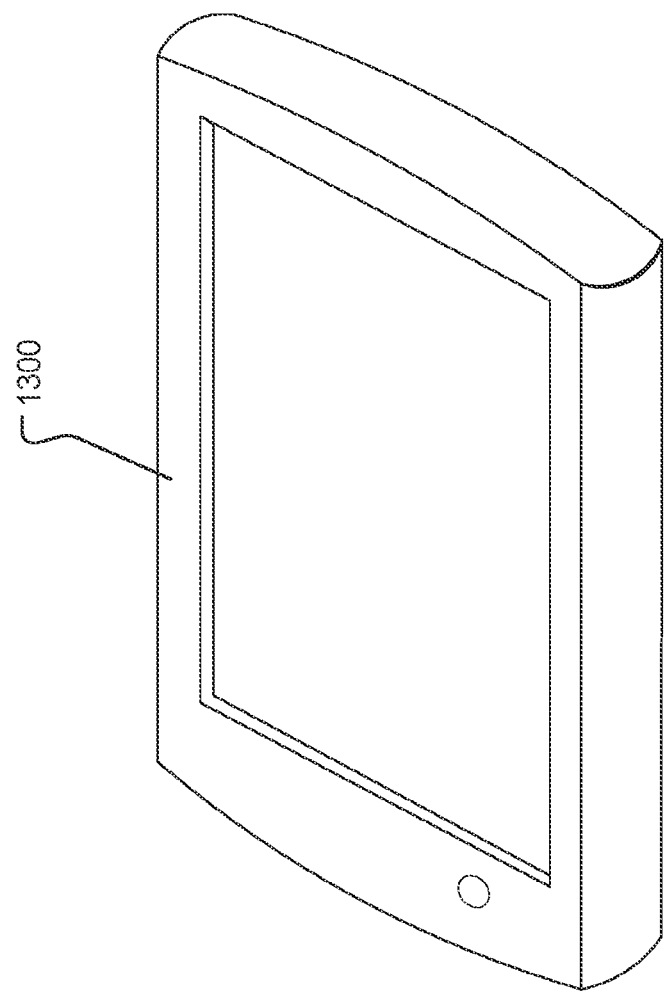
FIG. 13 illustrates a tablet computing device for executing one or more aspects of the present disclosure.

FIG. 13 illustrates an exemplary tablet computing device 1300 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure include a method comprising: receiving, at a software developer server, a service issue report associated with a service issue experienced during a software session; receiving service issue information associated with the service issue report; based on the service issue report and the service issue information, determining, by a machine learning model, a signature of the service issue; and based on the determined signature, automatically ranking, by a service issue ranker, the service issue in comparison to at least one other service issue, wherein the ranking is provided to a software developer to determine which service issue to address.

Any of the one or more above aspects, wherein the service issue information comprises telemetry associated with the software session.

Any of the one or more above aspects, wherein the service issue information comprises log information associated with the software session.

Any of the one or more above aspects, wherein the service issue information comprises user feedback associated with the software session.

Any of the one or more above aspects, wherein the determined signature is determined to be similar to a service issue signature for a past service issue.

Any of the one or more above aspects, wherein the ranking is based on information about the past service issue.

Any of the one or more above aspects, further comprising, based on the determined signature, determining a duplicate service issue similar to the service issue.

Any of the one or more above aspects, further comprising, based on the determined signature, assigning automatically the service issue to a software developer person or team to address the service issue.

Any of the one or more above aspects, wherein information about the past service issue includes statistics about an impact of the past service issue or a frequency of occurrence of the past service issue.

Any of the one or more above aspects, wherein the impact of the past service issue is measured using Key Performance Indicators.

Aspects of the present disclosure further include a computer storage media having stored thereon computer-executable instructions that when executed by a processor cause the processor to perform a method, the method comprising: receiving, from a client or a software service, a service issue report associated with a service issue experienced during a software session between the client and the software service; receiving telemetry information associated with the software session; based on the service issue report and the telemetry information, determining, by a machine learning model, a signature of the service issue; comparing the determined signature to signatures of past service issues; and based on information associated with the past service issues, automatically ranking the service issue in comparison to at least one other service issue, wherein the ranking is provided to a software developer to determine which service issue to address.

Any of the one or more above aspects, further comprising receiving log information associated with the software session or user feedback associated with the software session.

Any of the one or more above aspects, wherein the information associated with the past service issues are statistics about the past service issues.

Any of the one or more above aspects, wherein the statistics includes an impact of the past service issue or a frequency of occurrence of the past service issue.

Any of the one or more above aspects, wherein the impact of the past service issue is measured using Key Performance Indicators.

Aspects of the present disclosure further include a server, comprising: a memory storing computer executable instructions; a processor, in communication with the memory, wherein the processor reads the computer executable instructions from memory and when executing the computer executable instructions executes: a software developer service, wherein the software developer service: receives, from a client or a software service, a service issue report associated with a service issue experienced during a software session between the client and the software service; receives telemetry information associated with the software session; based on the service issue report and the telemetry information, determining, by a machine learning model, a signature of the service issue; compares the determined signature to signatures of past service issues; and based on information associated with the past service issues, automatically ranks the service issue in comparison to at least one other service issue, wherein the ranking is provided to a software developer to determine which service issue to address.

Any of the one or more above aspects, further comprising receiving log information associated with the software session or user feedback associated with the software session.

Any of the one or more above aspects, wherein the information associated with the past service issues are statistics about the past service issues, and wherein the statistics includes an impact of the past service issue or a frequency of occurrence of the past service issue.

Any of the one or more above aspects, wherein an impact of the past service issue is measured using Key Performance Indicators.

Any of the one or more above aspects, wherein the software developer service further, based on the determined signature, assigns automatically the service issue to a software developer person or team to address the service issue.

Any one or more of the aspects as substantially disclosed herein.

Any one or more of the aspects as substantially disclosed herein optionally in combination with any one or more other aspects as substantially disclosed herein.

One or means adapted to perform any one or more of the above aspects as substantially disclosed herein.

What is claimed is:

1. A computer-implemented method of prioritizing service issues comprising:
   receiving, at a software developer server, service issue information that identifies a plurality of service issues associated with one or more service sessions between software and one or more users;
   receiving, at the software developer server, telemetry information associated with the plurality of service issues, the telemetry information including data regarding use, operation, and performance of the software;
   based on the service issue information and the telemetry information, determining, by a machine learning model, a problem signature of each of the plurality of service issues; and
   determining an impact on the software developer server for each of the plurality of service issues based on the problem signature for each of the plurality of service issues and comparing the problem signature for each of the plurality of services issues with past problem signatures; and
   using the impact for each of the plurality of service issues to rank each of the plurality of service issues in order of priority of importance and assigning the service issues to a software developer to address the service issues.

2. The computer-implemented method of claim 1, wherein the telemetry information includes log information associated with the one or more software sessions.

3. The computer-implemented method of claim 1, wherein the service issue information includes user feedback.

4. The computer-implemented method of claim 1, further comprising:
   identifying a past service issue that has a problem signature that is similar to a problem signature of at least one of the plurality of service issues; and
   applying information about the past service issue to determine an impact for the at least one of the plurality of service issues that is similar to the past service issue.

5. The computer-implemented method of claim 4, wherein the information about the past service issue includes an impact on a key performance indicator.

6. The computer-implemented method of claim 1, wherein determining the impact for each of the plurality of service issues based on the problem signature for each of the plurality of service issues further comprises determining a prevalence of similar service issues based on a comparison of a problem signature of the plurality of problem signatures with past problem signatures.

7. The computer-implemented method of claim 1, categorizing each of the plurality service issues by a service issue type.

8. The computer-implemented method of claim 7, wherein the problem signature includes at least in part the service issue type.

9. The computer-implemented method of claim 8, further comprising assigning a service issue of the plurality of service issues to a developer based on the service issue type.

10. The computer-implemented method of claim 1, further comprising identifying duplicate service issues by:
    comparing each of the problem signatures for each the plurality of service issues; and
    determining if any two or more of the plurality of problem signatures have a similarly above a predetermined threshold.

11. The computer-implemented method of claim 10, wherein the predetermined threshold is 80%.

12. The computer-implemented method of claim 1, further comprising automatically assigning a service issue of the plurality of service issues to a software developer based on the problem signature for the service issue.

13. The computer-implemented method of claim 1, further comprising automatically assigning a service issue of the plurality of service issues to a software developer person based on the priority of importance.

14. A non-transitory computer storage media having stored thereon computer-executable instructions that when executed by a processor cause the processor to:
    receive a first service issue report identifying a first service issue experienced during a first software session between a client and a software service;

receive telemetry information associated with the first software session, the telemetry including information including regarding use, operation, and performance of the software;

based on the first service issue report and the telemetry information from the first software session, determine, by a machine learning model, a signature of the first service issue;

compare the signature of the first service issue to signatures of past service issues; and based on information associated with the signatures of past service issues, automatically identify an impact of the first service issue on a software developer server and assign the first service issue to a software developer to address the first service issue; and using the impact for each of the plurality of service issues to rank each of the plurality of service issues in order of priority of importance.

15. The non-transitory computer storage media of claim 14 further comprising computer-executable instructions that when executed by a processor cause the processor to:

receive a second service issue report identifying a second service issue experienced during a second software session between the client and the software service;

receive telemetry information associated with the second software session;

based on the second service issue report and the telemetry information from the second software session, determine, by a machine learning model, a signature of the second service issue;

compare the signature of the second service issue to the signature of the first service issue to determine an impact of the second service issue; and rank the first service issue and the second service issue in order of importance based on the impact of the first service issue and the impact of the second service issue.

16. The non-transitory computer storage media of claim 15 wherein the first service issue report is received from a client device and the second service issue report is received from a software service.

17. The non-transitory computer storage media of claim 15 further comprising computer-executable instructions that when executed by a processor cause the processor to:

assign the second service issue to a software developer based on the rank of the first service issue and the second service issue.

18. A server, comprising:

a memory storing computer executable instructions;

a processor, in communication with the memory, wherein the processor reads the computer executable instructions from memory and when executing the computer executable instructions executes:

a software developer service, wherein the software developer service:

receives, from a client or a software service, a service issue report associated with a service issue experienced during a software session between the client and the software service;

receives telemetry information associated with the software session, the telemetry information including data regarding use, operation, and performance of the software service;

based on the service issue report and the telemetry information, determining, by a machine learning model, a signature of the service issue;

determines an impact on the software developer server for the service issue based on the problem signature;

compares the signature of the service issue to signatures of past service issues; and based on information associated with the past service issues and impact, automatically ranks the service issue in comparison to at least one other service issue and assigns the service issue to a software developer to address the service issue.

\* \* \* \* \*